(12) United States Patent
Rix

(10) Patent No.: US 10,797,868 B2
(45) Date of Patent: Oct. 6, 2020

(54) SHARED SECRET ESTABLISHMENT

(71) Applicant: Irdeto B.V., Hoofddorp (NL)

(72) Inventor: Simon Rix, Hoofddorp (NL)

(73) Assignee: IRDETO B.V., Hoofddorp (NL)

( * ) Notice: Subject to any disclaimer, the term of this patent is extended or adjusted under 35 U.S.C. 154(b) by 187 days.

(21) Appl. No.: 15/994,182

(22) Filed: May 31, 2018

(65) Prior Publication Data
US 2019/0372759 A1     Dec. 5, 2019

(51) Int. Cl.
H04L 9/08      (2006.01)
H04L 9/32      (2006.01)
H04L 29/06     (2006.01)

(52) U.S. Cl.
CPC ........... H04L 9/085 (2013.01); H04L 9/0825 (2013.01); H04L 9/0844 (2013.01);
(Continued)

(58) Field of Classification Search
CPC ..... H04L 9/085; H04L 9/0825; H04L 9/0844; H04L 9/0861; H04L 9/3247; H04L 9/3263; H04L 63/123; H04L 9/32; H04L 9/0838
See application file for complete search history.

(56) References Cited

U.S. PATENT DOCUMENTS 6,594,761 B1    7/2003    Chow et al.
6,779,114 B1    8/2004    Chow et al.
(Continued)

FOREIGN PATENT DOCUMENTS

EP     1926278 A1      5/2008
WO     2009/140774 A1  11/2009
(Continued)

OTHER PUBLICATIONS

International Searching Authority, International Search Report and Written Opinion for International Application No. PCT/EP2019/064178 dated Jul. 22, 2019.
(Continued)

*Primary Examiner* — Meng Li
(74) *Attorney, Agent, or Firm* — Rimon PC, Marc Kaufman

(57) ABSTRACT

A method for a first entity and a second entity to establish a shared secret, wherein the first entity and the second entity each have a respective asymmetric key pair that comprises a public key and a corresponding private key, wherein the method comprises: the first entity generating a protected item of software that comprises a representation of the public key of the first entity and a message generator that is configured to use an authentication key; the first entity providing the protected item of software to the second entity; the second entity executing the protected item of software, said executing comprising the message generator generating a message that represents the public key of the second entity and that comprises authentication data generated using the authentication key so that integrity of the message is verifiable using a verification key corresponding to the authentication key; the first entity obtaining the message from the second entity; in response to a set of one or more conditions being satisfied, the first entity and the second entity together performing shared secret establishment to establish the secret, wherein performing the shared secret establishment comprises the first entity using the public key of the second entity as represented in the message and the second entity using the public key of the first entity as represented in the protected item of software, wherein one of the conditions is performance by the first entity of a (Continued)

successful verification of the integrity of the message using the verification key.

30 Claims, 6 Drawing Sheets

(52) U.S. Cl.
CPC .......... *H04L 9/0861* (2013.01); *H04L 9/3247* (2013.01); *H04L 9/3263* (2013.01); *H04L 63/123* (2013.01)

(56) References Cited

U.S. PATENT DOCUMENTS

| | | | |
|---|---|---|---|
| 6,842,862 B2 | 1/2005 | Chow et al. | |
| 7,350,085 B2 | 3/2008 | Johnson et al. | |
| 7,395,433 B2 | 7/2008 | Chow et al. | |
| 7,397,916 B2 | 7/2008 | Johnson et al. | |
| 2006/0153368 A1* | 7/2006 | Beeson | H04L 9/3066 380/30 |
| 2010/0023771 A1* | 1/2010 | Struik | H04L 9/002 713/171 |

FOREIGN PATENT DOCUMENTS

| | | | |
|---|---|---|---|
| WO | 2011/120123 | A1 | 10/2011 |
| WO | 2012/126077 | A1 | 9/2012 |
| WO | 2013/142979 | A1 | 10/2013 |
| WO | 2013/142980 | A1 | 10/2013 |
| WO | 2013/142981 | A1 | 10/2013 |
| WO | 2013/142983 | A1 | 10/2013 |
| WO | 2015/149828 | A1 | 10/2015 |
| WO | 2015/150376 | A1 | 10/2015 |
| WO | 2015/150391 | A1 | 10/2015 |
| WO | 2017/102880 | A1 | 6/2017 |
| WO | 2018/108275 | A1 | 6/2018 |

OTHER PUBLICATIONS

Chow et al., "A White-Box DES Implementation for DRM Applications", 16 pages.
Wikipedia, "Diffie-Hellman key exchange", website: https://en.wikipedia.org/w/index_php?title=Diffie-Hellman_key_exchange&oldid=840239160, 7 pages.
Wikipedia, "Digital signature", website: https://en.wikipedia.org/w/index.php?title=Digital_signature&oldid=843138271, 12 pages.
Wikipedia, "Elliptic-curve cryptography", website: https://en.wikipedia.org/w/index.php?title=Elliptic-curve_cryptography&oldid=843077214, 8 pages.
Wikipedia, "Ephemeral key", website: https://en.wikipedia.org/w/index.php?title=Ephemeral_key&oldid=830719795, 1 page.
Wikipedia, "File verification", website: https://en.wikipedia.org/w/index.php?title=File_verification&oldid=831393436, 3 pages.
Wikipedia, "HMAC", website: https://en.wikipedia.org/w/index.php?title=HMAC&oldid=832688082, 6 pages.
Wikipedia, "Message authentication code", website: https://en.wikipedia.org/w/index.php?title=Message_authentication_code&oldid=841501743, 5 pages.
Wikipedia, "Public-key cryptography", website: https://en.wikipedia.org/w/index.php?title=Public-key_cryptography&oldid=843074271, 15 pages.
Wikipedia, "Static key", website: https://en.wikipedia.org/w/index.php?title=Static_key&oldid=438435252, 1 page.
Wikipedia, "X.509", website: https://en.wikipedia.org/w/index.php?title=X.509&oldid=837078741, 15 pages.
Wikipedia, "Elliptic-curve Diffie-Hellman", website: https://en.wikipedia.org/w/index.php?title=Elliptic-curve_Diffie—Hellman&oldid=836070673, 2 pages.
Chow et al., "White-Box Cryptography and an AES Implementation", pp. 1-18.

* cited by examiner

SHARED SECRET ESTABLISHMENT

FIELD OF THE INVENTION

The present invention relates to methods, systems and computer programs for enabling a first entity and a second entity to establish a shared secret.

BACKGROUND OF THE INVENTION

In the field of cryptography, there are numerous methods or protocols for two entities to establish a shared secret. Two examples are given below, although it will be appreciated that many other methods for performing shared secret establishment are possible.

A first example of a shared secret establishment protocol is the so-called Diffie-Hellman shared secret establishment protocol (for which details can be found at https://en.wikipedia.org/wiki/Diffie%E2%80%93Hellman_key_exchange, the entire disclosure of which is incorporated herein by reference). In particular, suppose there are two entities A and B, then A and B may establish a shared secret s as follows:
1. A and B may agree a prime number p and an integer g that is a primitive root modulo p. This may be done in the clear, i.e. p and g do not need to be kept secret.
2. A chooses a positive integer $\alpha$ which A keeps secret and generates $X=g^{\alpha}$ mod p. A sends X to B. X does not need to be kept secret.
3. B chooses a positive integer $\beta$ which B keeps secret and generates $Y=g^{\beta}$ mod p. B sends Y to A. Y does not need to be kept secret.
4. A computes $Y^{\alpha}=g^{\alpha\beta}$ mod p.
5. B computes $X^{\beta}=g^{\alpha\beta}$ mod p.
6. Thus, A and B now share the secret $s=g^{\alpha\beta}$ mod p.

A second example of a shared secret establishment protocol is the so-called elliptic curve Diffie-Hellman shared secret establishment protocol (for which details can be found at https://en.wikipedia.org/wiki/Elliptic-curve_Diffie%E2%80%93Hellman the entire disclosure of which is incorporated herein by reference). In particular, suppose there are two entities A and B, then A and B may establish a shared secret s as follows:
1. A and B may agree domain parameters that define an elliptic curve for elliptic curve cryptography (normally represented as values (p, a, b, G, n, h) or (m, f(x), a, b, G, n, h)). This may be done in the clear. Such domain parameters are well-known (see, for example, https://en.wikipedia.org/wiki/Elliptic-curve_cryptography, the entire disclosure of which is incorporated herein by reference). Here, G is a point on the elliptic curve and n is the smallest positive integer such that $nG=\infty$.
2. A chooses an integer $\alpha$ in the range [1, n−1] which A keeps secret and generates $X=\alpha G$. A sends X to B. X does not need to be kept secret.
3. B chooses an integer $\beta$ in the range [1, n−1] which B keeps secret and generates $Y=\beta G$. B sends Y to A. Y does not need to be kept secret.
4. A computes the point $\alpha Y=(x_k, y_k)$.
5. B computes the point $\beta X=(x_k, y_k)$.
6. Thus, A and B now share the secret $s=x_k$ The shared secret s is often used as a symmetric key (or for generating a symmetric key), e.g. for use as a key for subsequent encryption and decryption of data communicated between A and B or for use as a key for message authentication (e.g. for a keyed hash function). Thus, such shared secret establishment protocols are often referred to as key establishment protocols.

The use of asymmetric keys (i.e. a public key with a corresponding private key) is very well-known in the field of cryptography (see, for example, https://en.wikipedia.org/wiki/Public-key_cryptography, the entire disclosure of which is incorporated herein by reference). For example, algorithms for performing encryption and decryption, or for generating and authenticating digital signatures, are well-known. Indeed, in the above shared secret establishment protocols, entity A may be viewed as having a public key X and a private key $\alpha$, whilst entity B may be viewed as having a public key Y and a private key $\beta$.

A cryptographic key is termed "ephemeral" if the value of that cryptographic key is generated afresh each time that key is to be used for a particular purpose, such as shared secret establishment (see https://en.wikipedia.org/wiki/Ephemeral_key, the entire disclosure of which is incorporated herein by reference), i.e. the key is used only once for a single transaction/process. Thus, an ephemeral key will normally assume a different value for each use of that key (i.e. for each transaction/process). The public keys X and Y and the private keys $\alpha$ and $\beta$ in the above shared secret establishment processes are usually ephemeral keys.

In contrast to ephemeral keys, a cryptographic key is termed "static" if it is intended for use for a longer period of time or to be repeatedly used (see https://en.wikipedia.org/wiki/Static_key, the entire disclosure of which is incorporated herein by reference).

In shared secret establishment protocols, in which ephemeral keys are exchanged (such as A providing public key X to B at step 2 and B providing public key Y to A at step 3 in the above examples), it is important for the recipient of the ephemeral key to know that the received key is authentic (i.e. it has originated from the correct source and has not been modified). For example, at step 2 in the above examples, B needs to be confident that the ephemeral key X that B receives did indeed originate from A and assumes the original value that A generated (i.e. it has not been corrupted or modified since being communicated from A). Typically, this is achieved by digitally signing the ephemeral key using a static asymmetric key pair that has an X.509 certificate (more details on X.509 certificates and public key infrastructure can be found at https://en.wikipedia.org/wiki/X.509, the entire disclosure of which is incorporated herein by reference). Often, the digital signing process uses a nonce sent from one party to the other to prove immediacy. For example, for step 2 in the above examples: B may send A a nonce (a randomly generated value); A may then digitally sign the nonce together with the ephemeral key X using A's static private key; A may send the signed nonce and ephemeral key X to B; B may use A's static public key that corresponds to A's static private key (and which B may obtain from, and authenticate via, an X.509 certificate) to authenticate the received data, including checking that the nonce value received from A is the nonce value that B provided.

The use of ephemeral keys in shared secret establishment therefore provides a method of establishing transient trust between A and B, i.e. they can use the transient shared secret s as a temporary secret to carry out desired activity (e.g. to perform a transaction, as a session key in subsequent communication, etc.)

The X.509 certificate schema relies on the ability of the device holding the asymmetric private key to keep the asymmetric private key confidential for a long period of time (for example for at least the duration of the Signing Keys Validity Period). This is often not the case or not possible for certain devices.

Further, the use of digital certificates, such as X.509 certificates, requires a supporting infrastructure to store, maintain, revoke and provide digital certificates. This also often involves a complex hierarchy of trust. This can impose a large overhead (from a computational, communication and management perspective) on systems that make use of digital certificates.

SUMMARY OF THE INVENTION

In summary, embodiments of the invention enable two entities to carry out shared secret establishment without requiring the use of static cryptographic keys and digital certificates for authenticating public keys. This may be done in a manner under the control of one of the two entities.

According to a first aspect of the invention, there is provided a method for a first entity and a second entity to establish a shared secret, wherein the first entity and the second entity each have a respective asymmetric key pair that comprises a public key and a corresponding private key, wherein the method comprises: the first entity generating a protected item of software that comprises a representation of the public key of the first entity and a message generator that is configured to use an authentication key; the first entity providing the protected item of software to the second entity; the second entity executing the protected item of software, said executing comprising the message generator generating a message that represents the public key of the second entity and that comprises authentication data generated using the authentication key so that integrity of the message is verifiable using a verification key corresponding to the authentication key; the first entity obtaining the message from the second entity; in response to a set of one or more conditions being satisfied, the first entity and the second entity together performing shared secret establishment to establish the secret, wherein performing the shared secret establishment comprises the first entity using the public key of the second entity as represented in the message and the second entity using the public key of the first entity as represented in the protected item of software, wherein one of the conditions is performance by the first entity of a successful verification of the integrity of the message using the verification key.

Use of the protected item of software in this way enables the shared secret establishment in a manner under control of the first entity and in a manner that does not require the use of static cryptographic keys and digital certificates for authenticating public keys.

Embodiments of the present invention find particular use in scenarios in which the use of digital certificates is difficult or undesirable (due to the complexity of the associated infrastructure required for digital certificates as well as the computational and resource overheads involved in using digital certificates and, in some scenarios, due to the inability of a device holding an asymmetric private key to keep the asymmetric private key confidential for a long period of time). It is often the case that a first entity may be a server-side system with substantial computational resources, but a second entity may be a much less capable device for which the processing of digital certificates is demanding—embodiments of the present invention find great utility in such scenarios to enable the first and second entities to establish a shared secret. For example, devices deployed in vehicles (such as cars) may have only relatively limited resources and security, whereas a car manufacturer may wish to establish shared secrets with those in-vehicle devices (e.g. when performing software or firmware updates or when retrieving diagnostic information)—embodiments of the present invention may assist with this, with the car manufacturer's back-end system acting as the first entity and the in-vehicle devices acting as second entities. Likewise, a bank may wish to establish shared secrets with customers' mobile devices (e.g. telephones) so that transactions can be conducted under the control of the bank and in a manner that is not computationally intensive—embodiments of the present invention may assist with this, with the bank's back-end system acting as the first entity and customer's mobile devices acting as second entities. It will be appreciated that many other deployment scenarios are possible for embodiments of the present invention.

According to a second aspect of the invention, there is provided a method for a first entity to establish a secret shared with a second entity, wherein the first entity and the second entity each have a respective asymmetric key pair that comprises a public key and a corresponding private key, wherein the method comprises the first entity: generating a protected item of software that comprises a representation of the public key of the first entity and a message generator that is configured to use an authentication key; providing the protected item of software to the second entity; obtaining from the second entity a message that represents the public key of the second entity and that comprises authentication data generated using the authentication key so that integrity of the message is verifiable using a verification key corresponding to the authentication key; and in response to a set of one or more conditions being satisfied, performing shared secret establishment with the second entity to establish the secret, wherein performing the shared secret establishment comprises the first entity using the public key of the second entity as represented in the message, wherein one of the conditions is performance by the first entity of a successful verification of the integrity of the message using the verification key.

In some embodiments of the above-mentioned aspects, one of the conditions is that the message is obtained by the first entity within a threshold period of time from the first entity providing the protected item of software to the second entity. In this way, the first entity can be satisfied that an attacker has not successfully launched an attack against the protected item of software, since it would take longer than the threshold period of time for an attacker to be able to successful analyze the protected item of software to carry out the attack and provide the message back to the first entity. Thus, reliance on a sufficient level of software protection together with a timer for receiving the message helps ensure integrity of the shared secret establishment. If the message is not obtained by the first entity within the threshold period of time from the first entity providing the protected item of software to the second entity, then the shared secret establishment may be considered to have failed—appropriate measures may then be taken (e.g. the first entity ceasing communication with the second entity).

In some embodiments of the above-mentioned aspects, the method comprises the first entity generating the asymmetric key pair of the first entity.

In some embodiments of the above-mentioned aspects, the method comprises the first entity generating the authentication key.

According to a third aspect of the invention, there is provided a method for a second entity to establish a secret shared with a first entity, wherein the first entity and the second entity each have a respective asymmetric key pair that comprises a public key and a corresponding private key, wherein the method comprises the second entity: obtaining, from the first entity, a protected item of software that comprises a representation of the public key of the first entity and a message generator that is configured to use an authentication key; executing the protected item of software, said executing comprising the message generator generating a message that represents the public key of the second entity and that comprises authentication data generated using the authentication key so that integrity of the message is verifiable using a verification key corresponding to the authentication key; providing the message to the first entity; performing shared secret establishment with the first entity to establish the secret, wherein performing the shared secret establishment comprises the second entity using the public key of the first entity as represented in the protected item of software.

In some embodiments of the above-mentioned aspects, the method comprises the second entity generating the asymmetric key pair of the second entity.

In some embodiments of the above-mentioned aspects, the protected item of software is arranged so that, when executed, the protected item of software performs integrity verification on the protected item of software, and the message generator only generates the message upon successful integrity verification on the protected item of software.

In some embodiments of the above-mentioned aspects, the authentication key is a symmetric key and the authentication data comprises a message authentication code. Alternatively, in some embodiments of the above-mentioned aspects, the authentication key and the verification key form an asymmetric key pair and the authentication data comprises a digital signature.

In some embodiments of the above-mentioned aspects, the public key of the first entity and the private key of the first entity are ephemeral keys.

In some embodiments of the above-mentioned aspects, the public key of the second entity and the private key of the second entity are ephemeral keys.

In some embodiments of the above-mentioned aspects, the authentication key and the verification key are ephemeral keys.

In some embodiments of the above-mentioned aspects, performing the shared secret establishment comprises performing one of: (a) a cryptographic key exchange protocol; (b) a Diffie-Hellman shared secret establishment protocol; (c) an elliptic-curve Diffie-Hellman shared secret establishment protocol.

In some embodiments of the above-mentioned aspects, the protected item of software is generated so that it is computationally infeasible to determine the authentication key from the protected item of software. In some embodiment of the above-mentioned aspects, the protected item of software is generated so that it is computationally infeasible to determine the authentication key from the protected item of software in a threshold period of time.

In some embodiments of the above-mentioned aspects, the method does not make use of an X.509 certificate or a static key to establish the shared secret.

According to a fourth aspect of the invention, there is provided a system comprising a first entity and a second entity, wherein the first entity and the second entity each have a respective asymmetric key pair that comprises a public key and a corresponding private key, wherein the system is arranged for the first entity and the second entity to establish a shared secret by: the first entity generating a protected item of software that comprises a representation of the public key of the first entity and a message generator that is configured to use an authentication key; the first entity providing the protected item of software to the second entity; the second entity executing the protected item of software, said executing comprising the message generator generating a message that represents the public key of the second entity and that comprises authentication data generated using the authentication key so that integrity of the message is verifiable using a verification key corresponding to the authentication key; the first entity obtaining the message from the second entity; in response to a set of one or more conditions being satisfied, the first entity and the second entity together performing shared secret establishment to establish the secret, wherein performing the shared secret establishment comprises the first entity using the public key of the second entity as represented in the message and the second entity using the public key of the first entity as represented in the protected item of software, wherein one of the conditions is performance by the first entity of a successful verification of the integrity of the message using the verification key.

According to a fifth aspect of the invention, there is provided a system comprising a first entity, wherein the system is arranged for the first entity to establish a secret shared with a second entity, wherein the first entity and the second entity each have a respective asymmetric key pair that comprises a public key and a corresponding private key, wherein the first entity is arranged to: generate a protected item of software that comprises a representation of the public key of the first entity and a message generator that is configured to use an authentication key; provide the protected item of software to the second entity; obtain from the second entity a message that represents the public key of the second entity and that comprises authentication data generated using the authentication key so that integrity of the message is verifiable using a verification key corresponding to the authentication key; and in response to a set of one or more conditions being satisfied, perform shared secret establishment with the second entity to establish the secret, wherein performing the shared secret establishment comprises the first entity using the public key of the second entity as represented in the message, wherein one of the conditions is performance by the first entity of a successful verification of the integrity of the message using the verification key.

In some embodiments of the fourth or fifth aspects, one of the conditions is that the message is obtained by the first entity within a threshold period of time from the first entity providing the protected item of software to the second entity.

In some embodiments of the fourth or fifth aspects, the first entity is arranged to generate the asymmetric key pair of the first entity.

In some embodiments of the fourth or fifth aspects, the first entity is arranged to generate the authentication key.

According to a sixth aspect of the invention, there is provided a system comprising a second entity, wherein the system is arranged for the second entity to establish a secret shared with a first entity, wherein the first entity and the second entity each have a respective asymmetric key pair that comprises a public key and a corresponding private key, wherein the second entity is arranged to: obtain, from the first entity, a protected item of software that comprises a representation of the public key of the first entity and a message generator that is configured to use an authentication key; execute the protected item of software, said executing comprising the message generator generating a message that represents the public key of the second entity and that comprises authentication data generated using the authentication key so that integrity of the message is verifiable using a verification key corresponding to the authentication key; provide the message to the first entity; perform shared secret establishment with the first entity to establish the secret, wherein performing the shared secret establishment comprises the second entity using the public key of the first entity as represented in the protected item of software.

In some embodiments of the fourth, fifth or sixth aspects, the second entity is arranged to generate the asymmetric key pair of the second entity.

In some embodiments of the fourth, fifth or sixth aspects, the protected item of software is arranged so that, when executed, the protected item of software performs integrity verification on the protected item of software, and the message generator only generates the message upon successful integrity verification on the protected item of software.

In some embodiments of the fourth, fifth or sixth aspects, the authentication key is a symmetric key and the authentication data comprises a message authentication code. Alternatively, in some embodiments of the fourth, fifth or sixth aspects, the authentication key and the verification key form an asymmetric key pair and the authentication data comprises a digital signature.

In some embodiments of the fourth, fifth or sixth aspects, the public key of the first entity and the private key of the first entity are ephemeral keys.

In some embodiments of the fourth, fifth or sixth aspects, the public key of the second entity and the private key of the second entity are ephemeral keys.

In some embodiments of the fourth, fifth or sixth aspects, the authentication key and the verification key are ephemeral keys.

In some embodiments of the fourth, fifth or sixth aspects, performing the shared secret establishment comprises performing one of: (a) a cryptographic key exchange protocol; (b) a Diffie-Hellman shared secret establishment protocol; (c) an elliptic-curve Diffie-Hellman shared secret establishment protocol.

In some embodiments of the fourth, fifth or sixth aspects, it is computationally infeasible to determine the authentication key from the protected item of software. In some embodiment of the fourth, fifth or sixth aspects, it is computationally infeasible to determine the authentication key from the protected item of software in a threshold period of time.

In some embodiments of the fourth, fifth or sixth aspects, the system does not make use of an X.509 certificate or a static key to establish the shared secret.

According to a seventh aspect of the invention, there is provided a computer program which, when executed by one or more processors, causes the one or more processors to carry out the method of any one of the first to third aspects. The computer program may be stored on a computer readable medium.

BRIEF DESCRIPTION OF THE DRAWINGS

Embodiments of the invention will now be described, by way of example only, with reference to the accompanying drawings, in which.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

1—Computer System Overview

Figure 1:
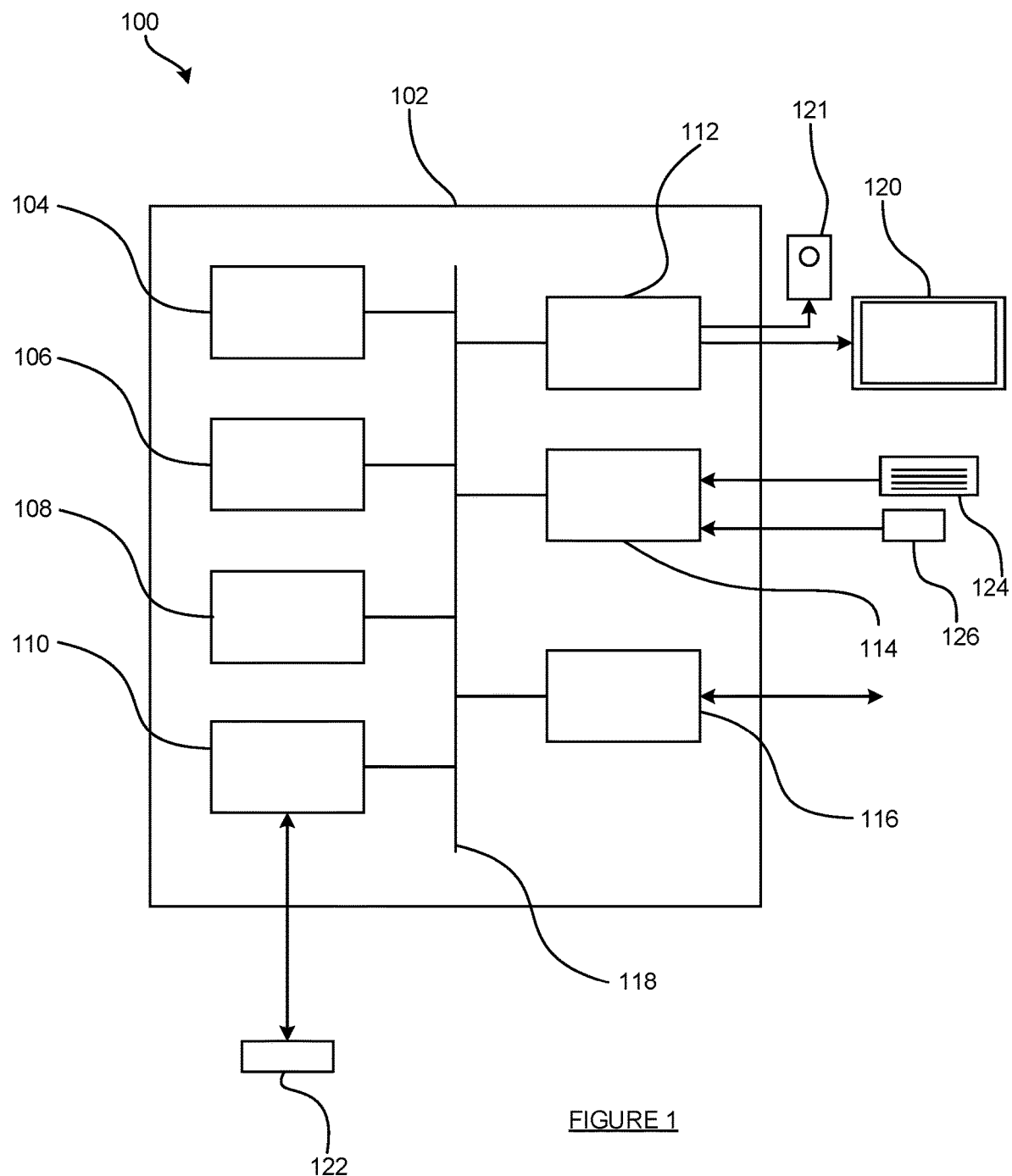
FIG. 1 schematically illustrates an example of a computer system.

FIG. 1 schematically illustrates an example of a computer system 100. The system 100 comprises a computer 102. The computer 102 comprises: a storage medium 104, a memory 106, a processor 108, an interface 110, a user output interface 112, a user input interface 114 and a network interface 116, which may be linked together over one or more communication buses 118.

The storage medium 104 may be any form of non-volatile data storage device such as one or more of a hard disk drive, a magnetic disc, a solid-state-storage device, an optical disc, a ROM, etc. The storage medium 104 may store an operating system for the processor 108 to execute in order for the computer 102 to function. The storage medium 104 may also store one or more computer programs (or software or instructions or code).

The memory 106 may be any random access memory (storage unit or volatile storage medium) suitable for storing data and/or computer programs (or software or instructions or code).

The processor 108 may be any data processing unit suitable for executing one or more computer programs (such as those stored on the storage medium 104 and/or in the memory 106), some of which may be computer programs according to embodiments of the invention or computer programs that, when executed by the processor 108, cause the processor 108 to carry out a method according to an embodiment of the invention and configure the system 100 to be a system according to an embodiment of the invention. The processor 108 may comprise a single data processing unit or multiple data processing units operating in parallel, separately or in cooperation with each other. The processor 108, in carrying out data processing operations for embodiments of the invention, may store data to and/or read data from the storage medium 104 and/or the memory 106.

The interface 110 may be any unit for providing an interface to a device 122 external to, or removable from, the computer 102. The device 122 may be a data storage device, for example, one or more of an optical disc, a magnetic disc, a solid-state-storage device, etc. The device 122 may have processing capabilities—for example, the device may be a smart card. The interface 110 may therefore access data from, or provide data to, or interface with, the device 122 in accordance with one or more commands that it receives from the processor 108.

The user input interface 114 is arranged to receive input from a user, or operator, of the system 100. The user may provide this input via one or more input devices of the system 100, such as a mouse (or other pointing device) 126 and/or a keyboard 124, that are connected to, or in communication with, the user input interface 114. However, it will be appreciated that the user may provide input to the computer 102 via one or more additional or alternative input devices (such as a touch screen). The computer 102 may store the input received from the input devices via the user input interface 114 in the memory 106 for the processor 108 to subsequently access and process, or may pass it straight to the processor 108, so that the processor 108 can respond to the user input accordingly.

The user output interface 112 is arranged to provide a graphical/visual and/or audio output to a user, or operator, of the system 100. As such, the processor 108 may be arranged to instruct the user output interface 112 to form an image/video signal representing a desired graphical output, and to provide this signal to a monitor (or screen or display unit) 120 of the system 100 that is connected to the user output interface 112. Additionally or alternatively, the processor 108 may be arranged to instruct the user output interface 112 to form an audio signal representing a desired audio output, and to provide this signal to one or more speakers 121 of the system 100 that is connected to the user output interface 112.

Finally, the network interface 116 provides functionality for the computer 102 to download data from and/or upload data to one or more data communication networks.

It will be appreciated that the architecture of the system 100 illustrated in FIG. 1 and described above is merely exemplary and that other computer systems 100 with different architectures (for example with fewer components than shown in FIG. 1 or with additional and/or alternative components than shown in FIG. 1) may be used in embodiments of the invention. As examples, the computer system 100 could comprise one or more of: a personal computer; a server computer; a mobile telephone; a tablet; a laptop; a television set; a set top box; a games console; other mobile devices or consumer electronics devices; etc. Additional it is also possible that some components of the computer system 100 are not located in a personal computer, server system or a laptop and are part of computer network connected to the personal computer, server system or a laptop via the network interface 116 and are located in the cloud of the computer network or are located in small computer devices such as mobile phones, smartphones and smart watches.

2—System Overview

Figure 2A:
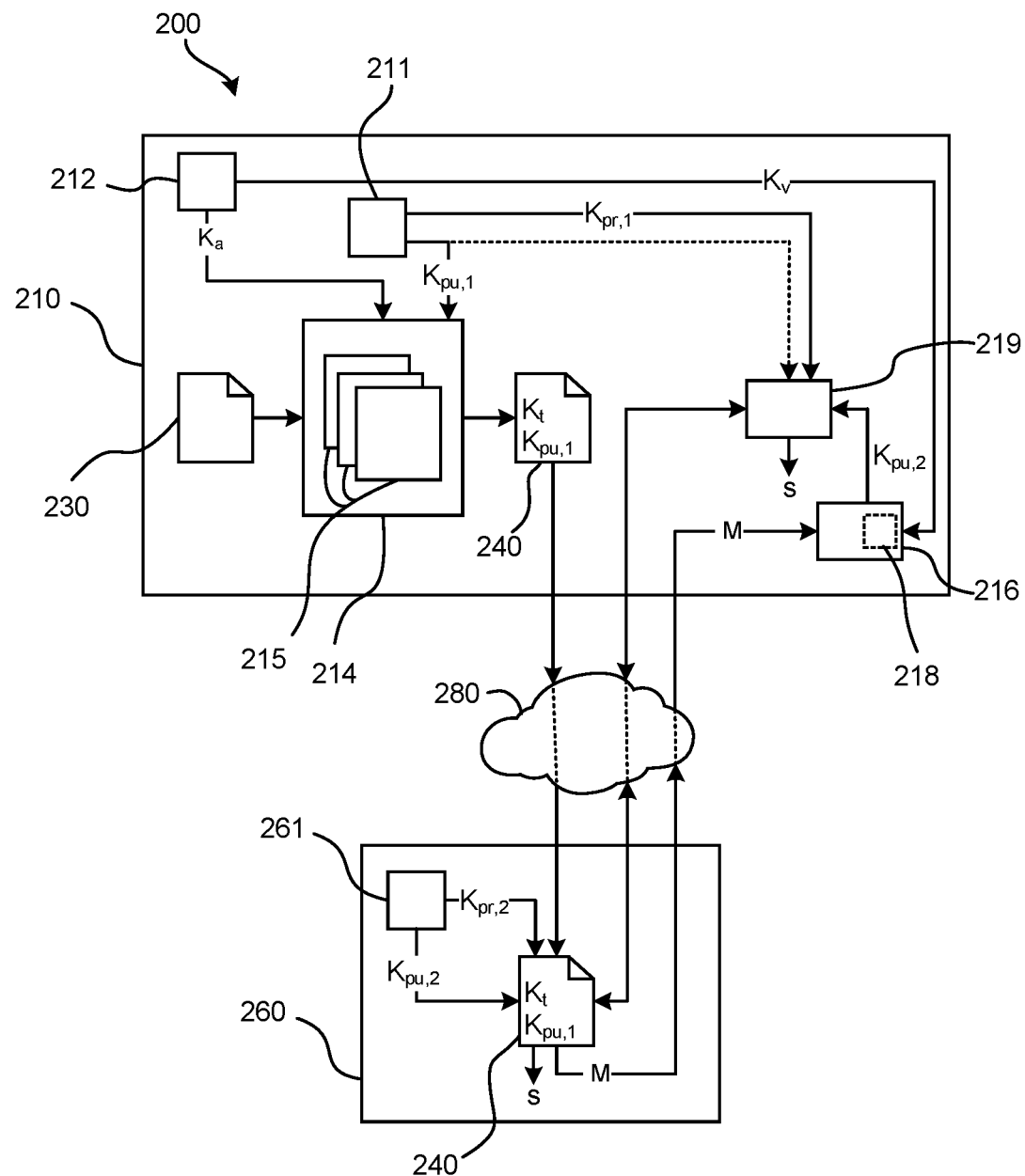
FIGS. 2a and 2b schematically illustrate a system according to various embodiments of the invention.

FIG. 2a schematically illustrates a system 200 according to various embodiments of the invention. The system 200 comprises a first entity 210, a second entity 260 and a network 280. In summary, embodiments of the invention are concerned with the first entity 210 and the second entity 260 establishing a shared secret, and methods for carrying out this shared secret establishment in a secured manner.

The first entity 210 and the second entity 260 may be arranged to communicate with each other over, or via, the network 280. The network 280 may be any kind of network suitable for transmitting or communicating data from any one of the first entity 210 and the second entity 260 to the other of the first entity 210 and the second entity 260. For example, the network 280 could comprise one or more of a local area network, a wide area network, a metropolitan area network, the internet, a wireless communications network, a cable network, a digital broadcast network, a satellite communication network, a telephone network, etc. The first entity 210 and the second entity 260 may communicate over the network 280 via any suitable communication mechanism/protocol in order to communicate data with each other. However, it will be appreciated that other communication scenarios are possible.

The first entity 210 and the second entity 260 may each be, or may each comprise, one or more computer systems 100 as described above with reference to FIG. 1. For example, the first entity 210 and/or the second entity 260 may be a personal computer, a server computer, a laptop, a mobile telephone, a tablet computer, a television, etc.

It will also be appreciated that the first entity 210 and the second entity 260 may each comprise respective software and/or hardware modules or components, with the first entity 210 and the second entity 260 forming part of the same computer system 100. In this case, the network 280 may be omitted, with the first entity 210 and the second entity 260 arranged to communicate with each other via one or more of the internal communication mechanisms of the computer system 100 (e.g. via one or more of the buses 118, use of the memory 106, etc.). Therefore, whilst embodiments of the invention may be described with reference to the network 280, it will be appreciated that the network 280 is optional in some embodiments.

The first entity 210 comprises: an ephemeral key pair generation module 211; an integrity key generation module 212; a protection system 214 that comprises one or more protector modules 215; an authentication module 216; and a shared secret establishment module 219. Each of these modules may be implemented, respectively, using one or more hardware components of the first entity 210 or as one or more software modules executed by a processor of the first entity 210.

The second entity 260 comprises an ephemeral key pair generation module 261, which may be implemented using one or more hardware components of the second entity 260 or as one or more software modules executed by a processor of the second entity 260.

The ephemeral key pair generation module 211 is arranged to generate an ephemeral asymmetric key pair for the first entity 210, i.e. a public key $K_{pu,1}$ and an associated private key $K_{pr,1}$. This is a key pair suitable for a shared secret establishment protocol. For example, in embodiments that use the Diffie-Heilman shared secret establishment protocol as described above, the ephemeral key pair generation module 211 may generate a random positive integer α (using any suitable means and/or any source of entropy) which the first entity 210 uses as its private key $K_{pr,1}$, and generates $X = g^\alpha \bmod p$ which the first entity 210 uses as its public key $K_{pu,1}$. Likewise, in embodiments that use the elliptic curve Diffie-Hellman shared secret establishment protocol as described above, the ephemeral key pair generation module 211 may generate a random integer α in the range [1, n−1] (using any suitable means and/or any source of entropy) which the first entity 210 uses as its private key $K_{pr,1}$, and generates $X = \alpha G$ which the first entity 210 uses as its public key $K_{pu,1}$. It will, of course, be appreciated that alternative asymmetric key pairs for alternative shared secret establishment protocols could be generated instead.

The integrity key generation module 212 is arranged to generate an authentication key $K_a$ and a corresponding verification key $K_v$. As shall be described later, the authentication key $K_a$ is to be used to generate authentication data that enables integrity of a message to be verified, where the verification is carried out using the corresponding verification key $K_v$. For example, the authentication data may comprise a message authentication code. Message authentication codes are well-known in the field of cryptography (see, for example, https://en.wikipedia.org/wiki/Message-_authentication_code, the entire disclosure of which is incorporated herein by reference). As is well known, message authentication codes make use of a cryptographic key. For example HMACs are well-known (see https://en.wikipedia.org/wiki/Hash-based_message_authentication_code, the entire disclosure of which is incorporated herein by reference), where a cryptographic key is used for a keyed hash function. Other types of message authentication codes are known and could be used instead. The key used to generate a message authentication code is a symmetric key, in that the key used to verify/authenticate the message authentication code is the same key as the key used to generate the message authentication code. Thus, in embodiments in which the authentication data comprises a message authentication code, the verification key $K_v$ is the same as the authentication key $K_a$. In some such embodiments, the key $K_a$ (and therefore the key $K_v$) is a generated as a random number (using any suitable means and/or any source of entropy). Likewise, digital signatures are well-known (see https://en.wikipedia.org/wiki/Digital_signature, the entire disclosure of which is incorporated herein by reference). As is well known, digital signatures make use of an asymmetric key pair, with the private key of the asymmetric key pair being used to generate the digital signature and the public key of the asymmetric key pair being used to verify or authenticate the digital signature. Thus, in embodiments in which the authentication data comprises a digital signature, the integrity key generation module 212 may be arranged to generate the authentication key $K_a$ as a private key for use in generating the digital signature and may also generate the verification key $K_v$ as the corresponding public key for later use by the first entity 210 to verify or authenticate the digital signature. In this case, $K_a$ is different from $K_v$.

The ephemeral key pair generation module 261 is arranged to generate an ephemeral asymmetric key pair for the second entity 260, i.e. a public key $K_{pu,2}$ and an associated private key $K_{pr,2}$. This is a key pair suitable for a shared secret establishment protocol. For example, in embodiments that use the Diffie-Hellman shared secret establishment protocol as described above, the ephemeral key pair generation module 261 may generate a random positive integer β (using any suitable means and/or any source of entropy) which the second entity 260 uses as its private key $K_{pr,2}$, and generates Y=g mod p which the second entity 260 uses as its public key $K_{pu,2}$. Likewise, in embodiments that use the elliptic curve Diffie-Hellman shared secret establishment protocol as described above, the ephemeral key pair generation module 261 may generate a random integer β in the range [1, n−1] (using any suitable means and/or any source of entropy) which the second entity 260 uses as its private key $K_{pr,2}$, and generates Y=βG which the second entity 260 uses as its public key $K_{pu,2}$. It will, of course, be appreciated that alternative asymmetric key pairs for alternative shared secret establishment protocols could be generated instead. Naturally, though, the asymmetric key pair generated by the ephemeral key pair generation module 261 is for use in the same shared secret establishment protocol as the asymmetric key pair generated by the ephemeral key pair generation module 211 (e.g. both key pairs are for use in elliptic curve Diffie-Hellman shared secret establishment).

As discussed above, the first entity 210 and the second entity 260 may carry out shared secret establishment once the first entity 210 knows the public key $K_{pu,2}$ of the second entity 260 and once the second entity 260 knows the public key $K_{pu,1}$ of the first entity 210. Embodiments of the invention enable this to happen without requiring the use of static cryptographic keys and X.509 certificates for authenticating the public keys $K_{pu,1}$ and $K_{pu,2}$, and in a manner under the control of the first entity 210. In summary, this is achieved as follows. The protection system 214 generates a protected item of software 240. This protected item of software 240 is based on an initial item of software 230 that comprises code (and possibly data) to carry out certain functionality F (as shall be discussed in more detail shortly). The protection system 214 embeds the public key $K_{pu,1}$ into the initial item of software 230, so that the public key $K_{pu,1}$ is represented within the protected item of software 240 (i.e. the protected item of software 240 has embedded therein, or stores, the public key $K_{pu,1}$). Additionally, the protection system 214 configures the protected item of software 240 so that the above-mentioned functionality F is arranged to use the authentication key $K_a$. As shall be discussed later, the protection system 214 applies one or more software protections when generating the protected item of software 240 from the initial item of software 230 and the keys $K_{pu,1}$ and $K_a$ to ensure that the key $K_a$ is hidden, i.e. it is hard or computationally infeasible or difficult to determine the key $K_a$ by analysing the protected item of software 240. Preferably, the protection system 214 applies the one or more software protections when generating the protected item of software 240 from the initial item of software 230 to make it sufficiently difficult for an attacker to determine the key $K_a$ from the protected item of software 240 so that the attacker would need greater than a period of time t to determine the key $K_a$ (i.e. the protected item of software 240 may be viewed as resistant to attack for the period of time t)—here, the period of time t may be at least the amount of time expected to complete the shared secret establishment (in the absence of an attack), such as 60 seconds. The public key $K_{pu,1}$ does not need to be represented in the protected item of software 240 in a hidden or concealed form—it is, after all, a public key. However, preferably, the protection system 214 applies the one or more software protections when generating the protected item of software 240 from the initial item of software 230 and the keys $K_{pu,1}$ and $K_a$ to ensure that the key $K_{pu,1}$ is also hidden, i.e. it is hard or computationally infeasible or difficult to determine the key $K_{pu,1}$ by analysing the protected item of software 240. Preferably, the protection system 214 applies the one or more software protections when generating the protected item of software 240 from the initial item of software 230 to make it sufficiently difficult for an attacker to determine the key $K_{pu,1}$ from the protected item of software 240 so that the attacker would need greater than a period of time t to determine the key $K_{pu,1}$ (i.e. the protected item of software 240 may be viewed as resistant to attack for the period of time t)—here, the period of time t may be at least the amount of time expected to complete the shared secret establishment (in the absence of an attack), such as 60 seconds. Preferably, the protection system 214 also applies one or more software protections when generating the protected item of software 240 from the initial item of software 230 and the keys $K_{pu,1}$ and $K_a$ so that the protected item of software 240, when executed, carries out a verification procedure to check the integrity of some or all of the protected item of software 240. The first entity 210 provides the protected item of software 240 to the second entity 260 (e.g. via the network 280). The second entity 260 may then execute the protected item of software 240. As discussed above, execution of the protected item of software 240 may cause the protected item of software 240 to carry out the verification procedure to check the integrity of some or all of the received protected item of software 240—the shared secret establishment may then only continue if the integrity check is successful (i.e. if the received protected item of software 240 has not been modified). As mentioned, the protected item of software 240, when executed, carries out certain functionality F. This functionality F comprises generating and sending (e.g. via the network 280) to the first entity 210 a message M in which the public key $K_{pu,2}$ of the second entity 260 is represented. This message M is generated using the key $K_a$ so that the first entity 210, upon receipt of the message M, may verify the integrity of some or all of the message M using the verification key $K_v$. Thus, the message M comprises authentication data generated by the protected item of software 240 based on, or using, the authentication key $K_a$. As discussed above, this authentication data could be, for example, a message authentication code or a digital signature. The first entity 210 may then perform an integrity check on the message M, using the verification key $K_v$. If this integrity check is successful (i.e. the received message M has not been modified), then the first entity 210 and the second entity 260 may engage in the shared secret establishment protocol, with the first entity 210 using the public key $K_{pu,2}$ of the second entity 260 (as represented in the received message M) and with the second entity 260 using the public key $K_{pu,1}$ of the first entity 210 (as represented in the received protected item of software 240). This shall be described in more detail below.

The second entity 260, in receiving the protected item of software 240, may assume that the protected item of software 240 is authentic (i.e. originated from the first entity 210 and has not been modified). Alternatively, as mentioned above, the protected item of software 240, when executed by the second entity 260, may be arranged to carry out an integrity verification check on itself, with the shared secret establishment only proceeding if the integrity verification check is successful (i.e. the check indicates that the protected item of software 240 as received by the second entity 260 has not been modified or tampered with). Either way, the second entity 260 receives the public key $K_{pu,1}$ of the first entity 210 in a manner in which the second entity 260 has confidence of the integrity and provenance of the public key $K_{pu,1}$. Likewise, given that the authentication key $K_a$ is securely hidden within the protected item of software 240, the first entity 210 may, in response to successful verification of the message M using the corresponding verification key $K_v$, have confidence that only the entity to which the protected item of software 240 was provided could have generated the message M and, therefore, has confidence that the public key $K_{pu,2}$ contained in the message M originated from (or corresponds to) the second entity 260. Both entities 210 and 260, having confidence in the other entity's public key, may then engage in the shared secret establishment protocol.

Figure 2B:
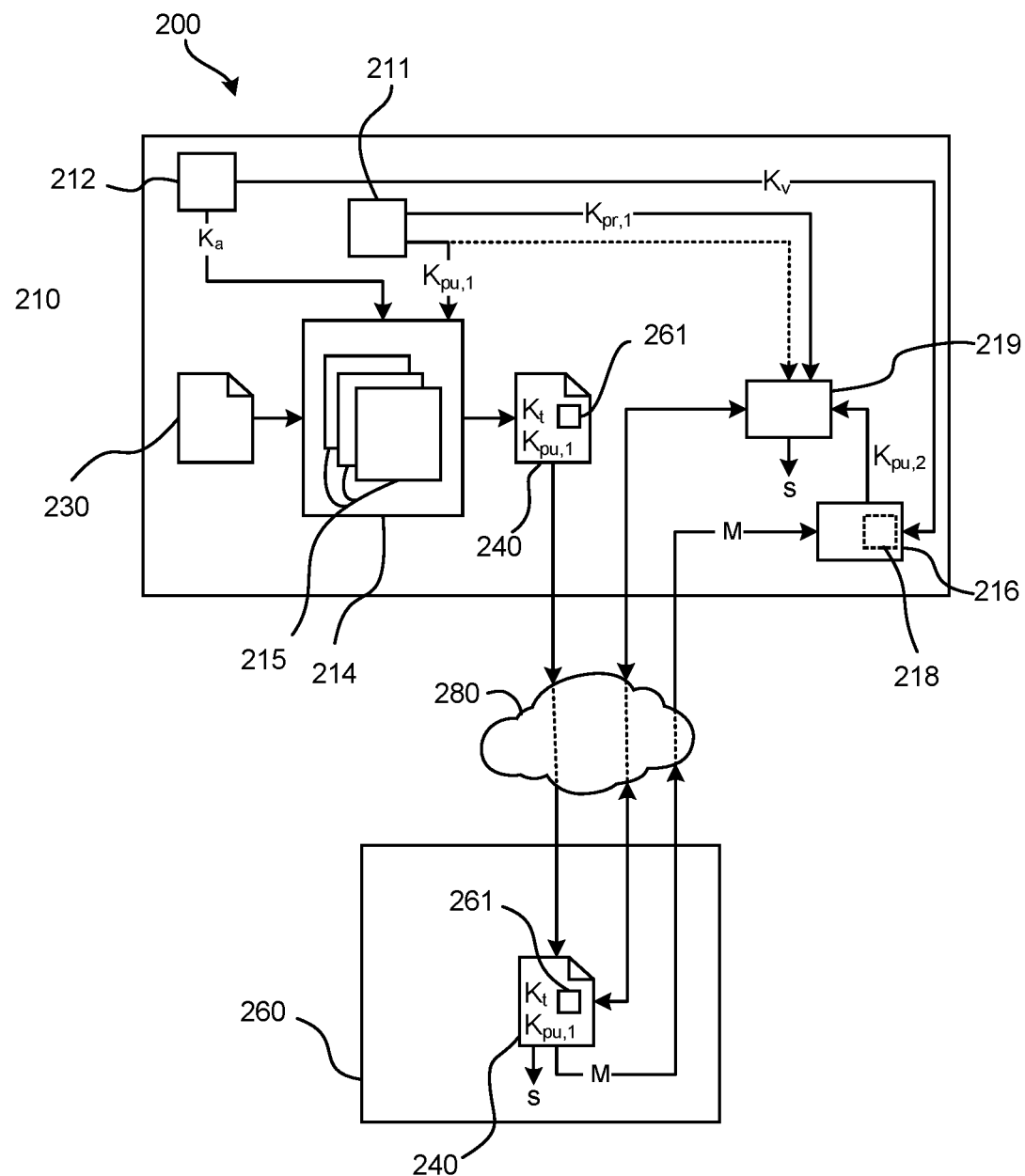

FIG. 2b schematically illustrates an alternative configuration for the system 200, according to various embodiments of the invention. The system 200 of FIG. 2b is the same as the system 200 of FIG. 2a, except that instead of the second entity 260 comprising the ephemeral key pair generation module 261, the ephemeral key pair generation module 261 forms part of the protected item of software 240. In this case, execution of the protected item of software 240 may cause the ephemeral key pair generation module 261 to generate the public key $K_{pu,2}$ and the private key $K_{pr,2}$.

3—Software Protection Techniques

A so-called "white-box" attack environment is an attack model for the execution of an item of software, in which the model identifies that an attacker has various capabilities as described in more detail below (i.e. the attacker can carry out certain actions/operations and has access to certain data). Therefore, if an attacker would have those capabilities when the item of software is actually being executed in a particular execution environment (e.g. using a particular computer/processor etc.) then one may say that the item of software is executing in a "white-box" environment. In the white-box attack environment, the attacker of the item of software is assumed to have full access to, and visibility of, the data being operated on (including intermediate values), memory contents and execution/process/control flow of the item of software. Moreover, in the white-box attack environment, the attacker is assumed to be able to modify the data being operated on, the memory contents and the execution/process/control flow of the item of software, for example by using a debugger—in this way, the attacker can experiment on, and try to manipulate the operation of, the item of software, with the aim of circumventing initially intended functionality and/or identifying secret information and/or for other purposes.

However, the item of software may need to use or store or generate secret information (e.g. one or more cryptographic keys or identifiers), where this information needs to remain hidden from, or unusable/inaccessible by, the attacker (except as part of the correct/intended functionality of the item of software); the item of software may need to execute different portions of code based on particular decision logic, where it is important to ensure that an attacker cannot force the software to execute one portion of code instead of another portion of code in contradiction to the decision logic; etc. The set-up, configuration and capabilities of the computer system on which the item of software is to execute are not necessarily known (or fully known) to, and/or are not controllable (or fully controllable) by, the provider of the item of software, and so it can be assumed that the item of software may end up being executed in a white-box attack environment. This is particularly relevant when the item of software is written in a scripted or interpreted language, such as JavaScript, due to the human-readable nature of scripted or interpreted languages (as opposed to, say, compiled binary executable files)—the user of the computer system that is executing the item of software can view, monitor and modify execution of such items of software (e.g. during interpretation or after just-in-time compilation), which makes it easy for an attacker to copy and modify the item of software and/or its data or control flow in an attempt to launch an attack against/using the item of software.

As shall be described later, the initial item of software 230 has one or more software protection techniques applied to it by the protection system 214, resulting in the protected item of software 240. The first entity 210 provides this protected item of software 240 to the second entity 260. The protection techniques applied in order to generate the protected item of software 240 aim to make it difficult for an attacker to carry out a successful attack on the protected item of software 240, and/or aim to reduce/mitigate the consequences of such an attack by an attacker—i.e. the protection techniques aim to secure the initial item of software 230 against the white-box attack environment.

The protection system 214 comprises one or more protector modules or components 215—in FIGS. 2a and 2b, three protector modules 215 are shown, but it will be appreciated that the protection system 214 may comprise fewer or more protector modules 215. The protector module(s) 215 is/are arranged to apply one or more "protections" to the initial item of software 230, or to a version of the item of software 230 that has already had one or more of these protections applied by one or more of the protector modules 215.

The initial item of software 230 and the protected item of software 240 may each comprise one or more computer programs (or software or modules) that may be stored as one or more files. Each file can contain or implement one or more functions. The initial item of software 230 and the protected item of software 240 may each be, or implement, one or more entire software applications, or one or more components for a software application (e.g. a library file), or a smaller component (e.g. a code snippet). The initial item of software 230 and the protected item of software 240 implement at least the above-mentioned functionality F (although they may implement additional functionality too). The initial item of software 230 may comprise source code written in one or more languages, one or more of which may be the same as the language(s) for the protected item of software 240, although this is not necessary. The initial item of software 230 and the protected item of software 240 may each comprise compiled/executable code and/or source code (or interpreted code). The initial item of software 230 and the protected item of software 240 may comprise compiled code for execution as (part of) a native application at the second entity 260. The initial item of software 230 and the protected item of software 240 may comprise code for execution within a virtual machine executing on the second entity 260. The initial item of software 230 and the protected item of software 240 may comprise code for execution within a browser executing on the second entity 260 (e.g. as a webapp or code of a webpage).

The term "code" as used herein in relation to an item of software refers to instructions/commands of the item of software. In addition to code, the item of software (e.g. the initial item of software 230 and the protected item of software 240) may comprise data and/or other resources, so that execution of the "code" (or execution of the item of software) comprises executing some or all of these instructions/commands, where this execution might potentially involve using some of the data and/or other resources if present in the item of software. The term "software element" as used herein in relation to an item of software refers to code and/or other components (e.g. data and/or other resources/assets) of the item of software. Thus, a software element of (or for) an item of software may comprise (a) one or more pieces of code (e.g. one or more instructions/commands) of (or for) the item of software, and/or (b) one or more pieces of data or other resources of (or for) the item of software.

Figure 3A:
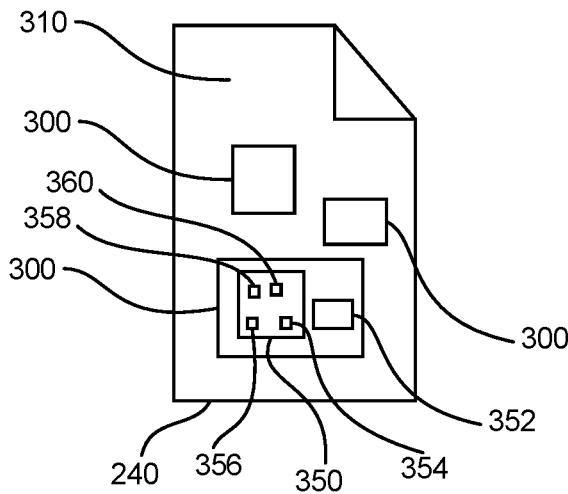
FIGS. 3a and 3b schematically illustrate an example of a protected item of software according to some embodiments of the invention.

FIG. 3a schematically illustrates an example of the protected item of software 240 for use with the system 200 of FIG. 2a, according to some embodiments of the invention (i.e. after the protection system 214 has applied one or more protections to alter the initial item of software 230). The initial item of software 230 comprises initial software elements. The protected item of software 240 may comprise some of the initial software elements 310 from the initial item of software 230 unchanged (although it will be appreciated that the protected item of software 240 may comprise no unchanged initial software elements 310 of the initial item of software 230). The protection system 214, in applying the one or more protections to the initial item of software 230, may modify one or more parts of the initial software elements from the initial item of software 230 and/or may introduce one or more additional software elements—these modified and/or introduced software elements shall be referred to herein as update software elements 300. At least some of the update software elements 300 comprise (or implement) shared secret establishment code 350. The update software elements 300 may additionally comprise data 352 for use by the shared secret establishment code 350. The purpose of the shared secret establishment code 350 (and the data 352 if present) shall be described in more detail later. In some embodiments, the update software elements 300 are formed from just the shared secret establishment code 350 (and the data 352 if present); in other embodiments, the update software elements 300 comprise software elements other than the shared secret establishment code 350 (and the data 352 if present), e.g. software elements to carry out integrity verification of the protected item of software 240. The shared secret establishment code 350 includes a message generator module 356, and may also include one or more of an interface/communication module 354, a shared secret protocol module 358, and a verification module 360 (as discussed in more detail later).

Figure 3B:
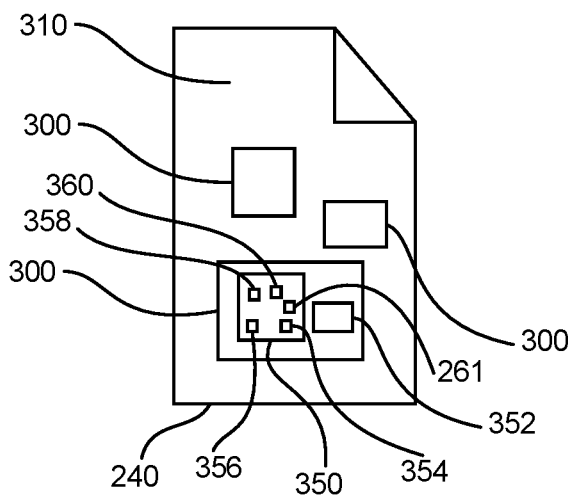

FIG. 3b schematically illustrates an example of the protected item of software 240 for use with the system 200 of FIG. 2b, according to some embodiments of the invention. This protected item of software 240 is the same as the protected item of software 240 illustrated in FIG. 3a, except that the shared secret establishment code 350 also comprises the ephemeral key pair generation module 261.

As mentioned above, the aim of the protector module(s) 215 is to protect (or secure) the functionality or data processing of the protected item of software 240 and/or to protect (or secure) data used or processed or generated or stored by the protected item of software 240. This can be achieved by applying a variety of software protection techniques (referred to herein as "protections"), such as one or more of cloaking techniques, homomorphic data transformation, control flow transformation, white-box cryptography, key hiding, program interlocking and boundary blending.

In particular, the protected item of software 240 (i.e. the initial item of software 230 after being processed by the protector module(s) 215) will provide at least the same functionality or data processing as the initial item of software 230. However, this functionality or data processing is typically implemented in the protected item of software 240 in a manner such that an operator of a computer system executing the protected item of software 240 cannot (or at least finds it difficult to) access or use this functionality or data processing from the protected item of software 240 in an unintended or unauthorised manner, whereas if that computer system were to execute the initial item of software 230 instead (i.e. in an unprotected form), then the operator of that computer system might have been able to launch a successful attack and thereby access or use the functionality or data processing in an unintended or unauthorised manner. Similarly, the protected item of software 240 may, due to processing by the protector module(s) 215, generate or use or access or operate on/with secret information (such as a cryptographic key or an identifier) that is represented in an encoded (or protected/obfuscated) form, using protected or obfuscated operations—this makes it more difficult (if not impossible) for an attacker to deduce or access that secret information (whereas such information may have been deducible or accessible from the initial item of software 230 without the protections having been applied).

For example:
   The initial item of software 230 may comprise a decision (or a decision block or a branch point) that is based, at least in part, on one or more items of data to be processed by the initial item of software 230. If the initial item of software 230 were executed in its unprotected form, then an attacker may be able to force the initial item of software 230 to execute so that a path of execution is followed after processing the decision even though that path of execution were not meant to have been followed. For example, the decision may comprise testing whether a program variable B is TRUE or FALSE, and the initial item of software 230 may be arranged so that, if the decision identifies that B is TRUE then execution path $P_T$ is followed/executed whereas if the decision identifies that B is FALSE then execution path $P_F$ is followed/executed. In this case, the attacker could (for example by using a debugger or by rewriting the initial item of software 230) force the initial item of software 230 to follow path $P_F$ if the decision identified that B is TRUE and/or force the initial item of software 230 to follow path $P_T$ if the decision identified that B is FALSE. Therefore, in some embodiments, one or more of the protector module(s) 215 aim to prevent (or at least make it more difficult) for the attacker to do this by applying one or more software protection techniques to the decision within the initial item of software 230.

The initial item of software 230 may comprise one or more of a security-related function; an access-control function; a cryptographic function; and a rights-management function; etc. Such functions often involve the use or generation of secret data, such as one or more cryptographic keys. The processing may involve using and/or operating on or with one or more cryptographic keys. If an attacker were able to identify or determine the secret data, then a security breach has occurred and control or management of data (such as audio and/or video content) that is protected by the secret data may be circumvented. Therefore, in some embodiments, one or more of the protector module(s) 215 aim to prevent (or at least make it more difficult) for the attacker to identify or determine one or more pieces of secret data by applying one or more software protection techniques to such functions within the initial item of software 230. This may involve arranging the protected item of software 240 so that it represents secret data in an obfuscated manner within the protected item of software 240 itself. Additionally or alternatively, this may involve arranging the protected item of software 240 with functionality to be able to dynamically read and write secret data in an obfuscated or encrypted form to/from a memory.

The protected item of software 240 may comprise additional functionality (i.e. functionality not originally in the initial item of software 230). This additional functionality may be included into the initial item of software 230 to help form the protected item of software 240 by the protector module(s) 215. This additional functionality may comprise, for example, some or all of the shared secret establishment code 350.

There are numerous techniques, referred to herein as "white-box obfuscation techniques", for transforming the initial item of software 230 so that it is resistant to white-box attacks (i.e. attacks that could be launched, or are available, under the white-box attack environment). Examples of such white-box obfuscation techniques can be found, in "White-Box Cryptography and an AES Implementation", S. Chow et al. Selected Areas in Cryptography, 9$^{th}$ Annual International Workshop, SAC 2002, Lecture Notes in Computer Science 2595 (2003), p 230-270 and "A White-box DES Implementation for DRM Applications", S. Chow et al, Digital Rights Management, ACM CCS-9 Workshop, D R M 2002, Lecture Notes in Computer Science 2696 (2003), p 1-15, the entire disclosures of which are incorporated herein by reference. Additional examples can be found in U.S. 61/055,694 and WO2009/140774, the entire disclosures of which are incorporated herein by reference. Some white-box obfuscation techniques (such as those described above and others set out below) enable storage and/or use, and possibly manipulation of, secret/sensitive data (such as cryptographic keys) in a transformed/secured manner from which it is difficult/impossible for an attacker to access or derive the underlying secret/sensitive data. Some white-box obfuscation techniques implement data flow obfuscation—see, for example, U.S. Pat. Nos. 7,350,085, 7,397,916, 6,594,761 and 6,842,862, the entire disclosures of which are incorporated herein by reference. Some white-box obfuscation techniques implement control flow obfuscation—see, for example, U.S. Pat. Nos. 6,779,114, 6,594,761 and 6,842,862 the entire disclosures of which are incorporated herein by reference. However, it will be appreciated that other white-box obfuscation techniques exist and that embodiments of the invention may use any white-box obfuscation techniques.

As another example, it is possible that the initial item of software 230 may be intended to be provided (or distributed) to, and used by, a particular second entity 260 (or a particular set of second entities 260) and that it is, therefore, desirable to "lock" the initial item of software 230 to the particular second entity(s) 260, i.e. to prevent the initial item of software 230 (once protected) from correct execution by an entity other than the second entity(s) 260. Consequently, there are numerous techniques, referred to herein as "node-locking" protection techniques, for transforming the initial item of software 230 so that the protected item of software 240 can execute on (or be executed by) one or more predetermined/specific computer systems but will not execute on other computer systems. Examples of such node-locking techniques can be found in WO2012/126077, the entire disclosure of which is incorporated herein by reference. However, it will be appreciated that other node-locking techniques exist and that embodiments of the invention may use any node-locking techniques.

Digital watermarking is a well-known technology. In particular, digital watermarking involves modifying an initial digital object to produce a watermarked digital object. The modifications are made so as to embed or hide particular data (referred to as payload data) into the initial digital object. The payload data may, for example, comprise data identifying ownership rights or other rights information for the digital object. The payload data may identify the (intended) recipient of the watermarked digital object, in which case the payload data is referred to as a digital fingerprint—such digital watermarking can be used to help trace the origin of unauthorised copies of the digital object. Digital watermarking can be applied to items of software. Examples of such software watermarking techniques can be found in U.S. Pat. No. 7,395,433, the entire disclosure of which is incorporated herein by reference. However, it will be appreciated that other software watermarking techniques exist and that embodiments of the invention may use any software watermarking techniques.

It may be desirable to provide different versions or instances of the initial item of software 230 to different second entities 260 (or different users of the second entity 260). The different versions of the initial item of software 230 provide the same functionality—however, the different versions of the initial item of software 230 are programmed or implemented differently. This may help limit the impact of an attacker successfully attacking the protected item of software 240. In particular, if an attacker successfully attacks his version of the protected item of software 240, then that attack (or data, such as cryptographic keys, discovered or accessed by that attack) may not be suitable for use with different versions of the protected item of software 240. Similarly, having different protected instances 240 of the initial item of software 230 helps identify specific users (e.g. specific second entities 260) of the protected item of software 240. Consequently, there are numerous techniques, referred to herein as "diversity" techniques, for transforming the initial item of software 230 so that different protected versions of the initial item of software 230 are generated (i.e. so that "diversity" is introduced). Examples of such diversity techniques can be found in WO2011/120123, the entire disclosure of which is incorporated herein by reference. However, it will be appreciated that other diversity techniques exist and that embodiments of the invention may use any diversity techniques.

It is often desirable to ascertain the operational correctness of an item of software. This is often referred to as "integrity verification", or IV (see, for example, https://en.wikipedia.orgwiki/File_verification, the entire disclosure of which is incorporated herein by reference). IV aims to ensure that the item of software executed at runtime is the version released by the supplier of the item of software. This helps the end-user or a service provider to trust that an original/authentic copy of the item if software is executing instead of a modified version (e.g. a version containing malware).

One traditional approach to IV is to compute a value based on some or all of the original software elements of the item of software—this value could, for example, be calculated as a checksum or hash or a cryptographically strong hash of those software elements. Use of a cryptographically strong hash makes it infeasible for the attacker to modify those software elements whilst maintaining the original hash-value—hence, a modification to the software elements can be identified by detecting an incorrect or unexpected hash-value. Such IV can be carried out by an IV module that has been incorporated, say, into the item of software or that is executing as a separate process.

Other approaches to IV are disclosed, for example, in WO2015/149828 (the entire disclosure of which is incorporated herein by reference). With this approach, a secured software application comprises assertion tests that verify whether a predetermined invariant condition holds. These checks on invariant conditions increase the integrity of the software application as attacker modifications are likely to cause an invariant property to fail. Further approaches to IV are disclosed, for example, in WO2017/102880 and PCT/EP2016/081164 (the entire disclosures of which are incorporated herein by reference). It will be appreciated that other techniques for performing IV could be used instead.

Some IV techniques may be carried out independently by an IV module that forms part of the protected item of software whose integrity is being verified. Other IV techniques may be carried out by reference to a separate entity (e.g. a verification server/system)—for example, verification data may be sent to a verification server/system by an IV module of a protected item of software, and the verification server/system checks whether that verification data corresponds to a correct version/implementation of the protected item of software.

Often, with IV techniques, if the integrity check identifies that a modification has been made to the item of software, then certain functionality (e.g. "normal" operation) of the item of software may be disabled or prevented (so that an attacker cannot access that functionality) and/or other functionality (e.g. reporting that an attack has occurred) may be carried out.

The above-mentioned white-box obfuscation techniques, node-locking techniques, software watermarking techniques, diversity techniques and IV techniques are examples of software protection techniques. It will be appreciated that there are other methods of applying protection to the initial item of software 230. Thus, the term "software protection techniques", or "protections" as used herein shall be taken to mean any method of applying protection to the initial item of software 230 (with the aim of thwarting attacks by an attacker, or at least making it more difficult for an attacker to be successful with his attacks), such as any one or more of the above-mentioned white-box obfuscation techniques (which aim to secure against a white-box attack environment) and/or any one or more of the above-mentioned node-locking techniques and/or any one or more of the above-mentioned software watermarking techniques and/or any one or more of the above-mentioned diversity techniques and/or any one or more of the above-mentioned IV techniques. The protector module(s) 215 may, therefore, be arranged to apply any one or more of the above-mentioned software protection techniques or protections to the initial item of software 230 to generate the protected item of software 240—this may involve a first protector module 215 applying a software protection technique to some or all of the initial item of software 230, and then possibly one or more protector modules 215 applying a software protection technique to some or all of the output of a preceding protector module 215 (e.g. sequential application/layering of protections). The resultant protected item of software 240 may, therefore, be referred to as "protected software".

There are numerous ways in which the protector module(s) 215 may implement the above-mentioned software protection techniques within the initial item of software 230. For example, to protect the initial item of software 230, the protector module(s) 215 may modify one or more software elements within the initial item of software 230 and/or may add or introduce one or more new software elements into the initial item of software 230. The actual way in which these modifications are made or the actual way in which the new software elements are written can, of course, vary—there are, after all, an infinite number of ways of writing software to achieve the same functionality.

Numerous examples and methods for implementing the protector module(s) 215 so as to generate the protected item of software 240 from the initial item of software 230 can be found, for example, in WO2015/150391 and WO2015/150376, the entire disclosures of which are incorporated herein by reference. Further examples of protection techniques that the protector module(s) 215 may be arranged to apply can be found in WO2013/142981. WO2013/142979, WO2013/142983 and WO2013/142980, the entire disclosures of which are incorporated herein by reference.

The protection system 214 may comprise or implement a library database/store (not shown in FIGS. 2a and 2b). The library database may comprise one or more pre-generated protected software modules (or functions or procedures or software snippets), and potentially multiple differently implemented/protected instances for the same underlying functionality/software. These modules are "pre-generated" insofar as they are generated independently of, and potentially prior to receipt of, the initial item of software 230. This library database may, therefore, be viewed as a repository available to the protection system 214, so that the protection system 214 (or one or more of the protector modules 215) can use, or include within the protected item of software 240, one or more of the modules stored within the library database. To this end, the protection system 214 may be arranged to execute a library application that generates the software modules stored in the library database. An example of such a library application to generate protected modules is described in WO2015/150376, the entire disclosure of which is incorporated herein by reference. The protection system 214 may be arranged to obtain software modules directly from the library database or may be arranged to obtain software modules from the library database via the library application. It will be appreciated that the library application may be part of, and may be executed by, an entity other than the protection system 214. Similarly, it will be appreciated that the library database may be part of, and may be provided by, an entity other than the protection system 214.

4—Shared Secret Establishment

Figure 4A:
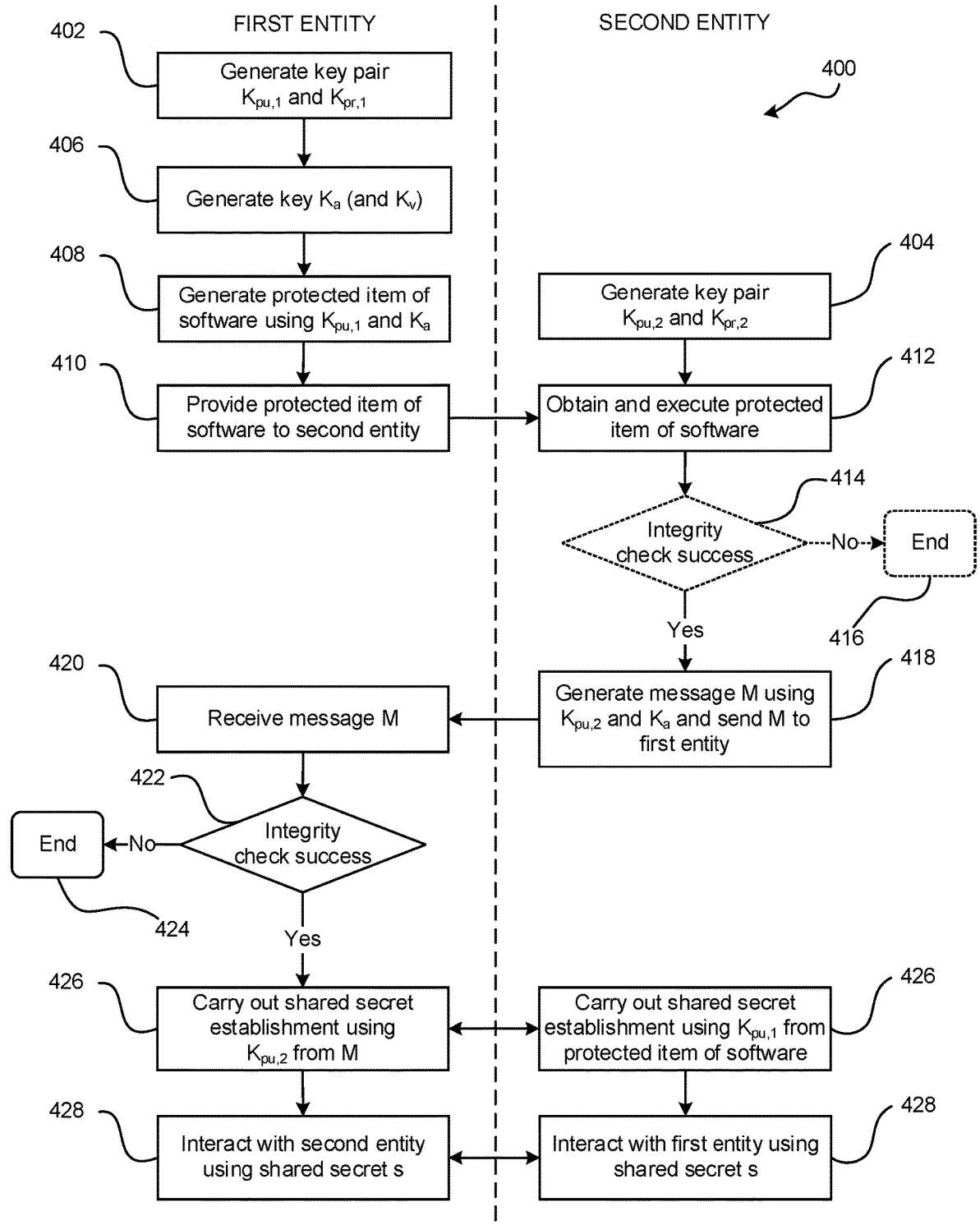
FIGS. 4a and 4b are flow charts illustrating a method for a first entity and a second entity to establish a shared secret according to some embodiments of the invention.

FIG. 4a is a flow chart illustrating a method 400 for the first entity 210 and the second entity 260 to establish a shared secret according to some embodiments of the invention.

At a step 402, the first entity 210 uses its ephemeral key pair generation module 211 to generate the public key $K_{pu,1}$ and the private key $K_{pr,1}$, as has been described above.

At a step 406, the first entity 210 uses its integrity key generation module 212 to generate the authentication key $K_a$, as has been described above. In embodiments in which the authentication key $K_a$ is a symmetric key, then the first entity 210 uses the authentication key $K_a$ as the verification key $K_v$ too. In embodiments in which the authentication key $K_a$ is an asymmetric key, then the first entity 210 uses its integrity key generation module 212 to generate the verification key $K_v$ corresponding to the authentication key $K_a$, as has been described above.

At a step 408, the first entity 210 generates the protected item of software 240.

As mentioned above, the protected item of software 240 comprises a representation of the generated public key $K_{pu,1}$ (i.e. the public key $K_{pu,1}$ is embedded or stored within the protected item of software 240). In some embodiments, the protection system 214 uses one or more software protection techniques (such as the above-described white-box software protection techniques) to hide or obfuscate the public key $K_{pu,1}$ within the protected item of software 240). However, this is not essential since, for the purpose of the key establishment protocols (such as the Diffie-Hellman protocol and the elliptic curve Diffie-Hellman protocol), secrecy of the public keys is not necessary (the public keys are, after all, public). The public key $K_{pu,1}$ may, for example, be stored as part of the data 352.

Figure 5:
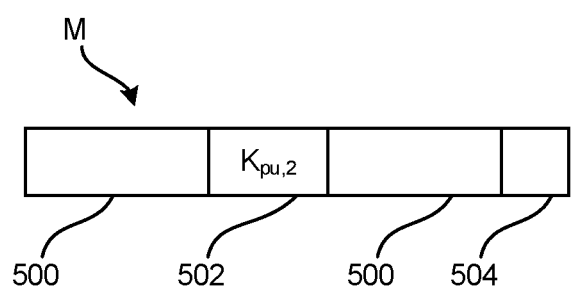
FIG. 5 schematically illustrates a message according to some embodiments of the invention.

As mentioned above, the protected item of software 240 comprises a message generator module 356. The message generator module 356 is arranged to (when executed by the second entity 260) generate a message M that represents the public key $K_{pu,2}$ of the second entity 260, wherein integrity of the message M is verifiable using the verification key $K_v$. Thus, the message M has embedded or encoded therein the public key $K_{pu,2}$. The message M also comprises authentication data which can be used, together with the verification key $K_v$ to check the integrity of some or all of the message M (i.e. to ascertain whether or not a modification has been made to those parts of the message M since the authentication data and the message M were initially generated). The authentication data is generated so that at least the integrity of the representation of the public key $K_{pu,2}$ within the message M can be verified using the verification key $K_v$. FIG. 5 schematically illustrates the message M according to some embodiments of the invention. As shown, the message M comprises a representation 502 of the public key $K_{pu,2}$ and the above-mentioned authentication data 504, and may comprise other data 500 (such as metadata, address data, information identifying the second entity 260, information that enables the first entity 210 to identify the relevant verification key $K_v$ for verifying the message M etc.). As discussed above, the authentication data 504 may comprise a message authentication code for the message M generated using the authentication key $K_a$. Alternatively, the authentication data 504 may comprise a digital signature generated for the message M using the authentication key $K_a$ as the signature key.

Thus, the protection system 214 may configure the message generator module 356 to use the authentication key $K_a$. For example, the initial item of software 230 may comprise software elements to carry out the generation of the message M, but without being configured for any specific cryptographic key, and the protection system 214 may configure those software elements to use the authentication key $K_a$. The protection system 214 performs one or more software protection techniques to hide the authentication key $K_a$ within the protected item of software 240 (i.e. to make it computationally difficult or computationally infeasible to determine the authentication key $K_a$ from, or based on an inspection/analysis of, the protected item of software 240). For example, the message generator module 356 may be implemented by one or more lookup tables which inherently use the authentication key $K_a$ but from which it is computationally difficult or computationally infeasible to extract or identify the authentication key $K_a$—the protection system 214 may configure a message generator module in the initial item of software 230 so as to use one or more lookup tables that implement, or are based on, the authentication key $K_a$, to thereby generate the message generator module 356 for the protected item of software 240. The above-mentioned white-box cryptographic techniques are one way of achieving such concealment of the authentication key $K_a$ whilst enabling the authentication key $K_a$ to be used during execution of the protected item of software 240. It will be appreciated, however, that other methods for generating the protected item of software 240 so as to include a message generator module 356 that uses the authentication key $K_a$ in a hidden embedded manner could be used.

Thus, at the step 408, the first entity 210 generates the protected item of software 240, where the protected item of software 240 comprises a representation of the public key $K_{pu,1}$ of the first entity 210 and a message generator 356 that is configured to use the authentication key $K_a$, with this being carried out (by the protection system 214) so that it is computationally infeasible to determine the authentication key $K_a$ from the protected item of software 240.

The step 408 may additionally comprise the protection system 214 including, as part of the shared secret establishment code 350, a verification module 360 that, when the protected item of software 240 is executed, is arranged to carry out integrity verification on some or all of the protected item of software 240. Preferably this includes verifying the integrity of the public key $K_{pu,1}$ and the message generator module 356 within the protected item of software 240. The verification module 360 may use any suitable integrity verification process to achieve this, such as any of the above-mentioned IV techniques.

The step 408 may additionally comprise the protection system 214 configuring the protected item of software 240 so that it only executes correctly (i.e. carries out the shared secret establishment) on the second entity 260—i.e. the protection system 214 may carry out node locking techniques to tie or lock the protected item of software 240 to the second entity 260. In this way, the first entity 210 has greater confidence that the message M will be received from the second entity 260.

The initial item of software 230 may comprise the message generator module 356 (albeit not yet configured for the particular authentication key $K_a$) and one or more of the interface/communication module 354, the shared secret protocol module 358, and the verification module 360 (which shall be discussed in more detail later), and the protection system 214 may then be arranged to apply one or more software protection techniques to these modules (including configuring the message generator module 356 to use the authentication key $K_a$).

At a step 410, the first entity 210 provides, or makes available, the protected item of software 240 to the second entity 260.

At a step 404, the second entity 260 uses its ephemeral key pair generation module 261 to generate the public key $K_{pu,2}$ and the private key $K_{pr,2}$, as has been described above.

At a step 412, the second entity 260 receives, or obtains, the protected item of software 240 from the first entity 210 and begins executing the protected item of software 240.

Figure 4B:
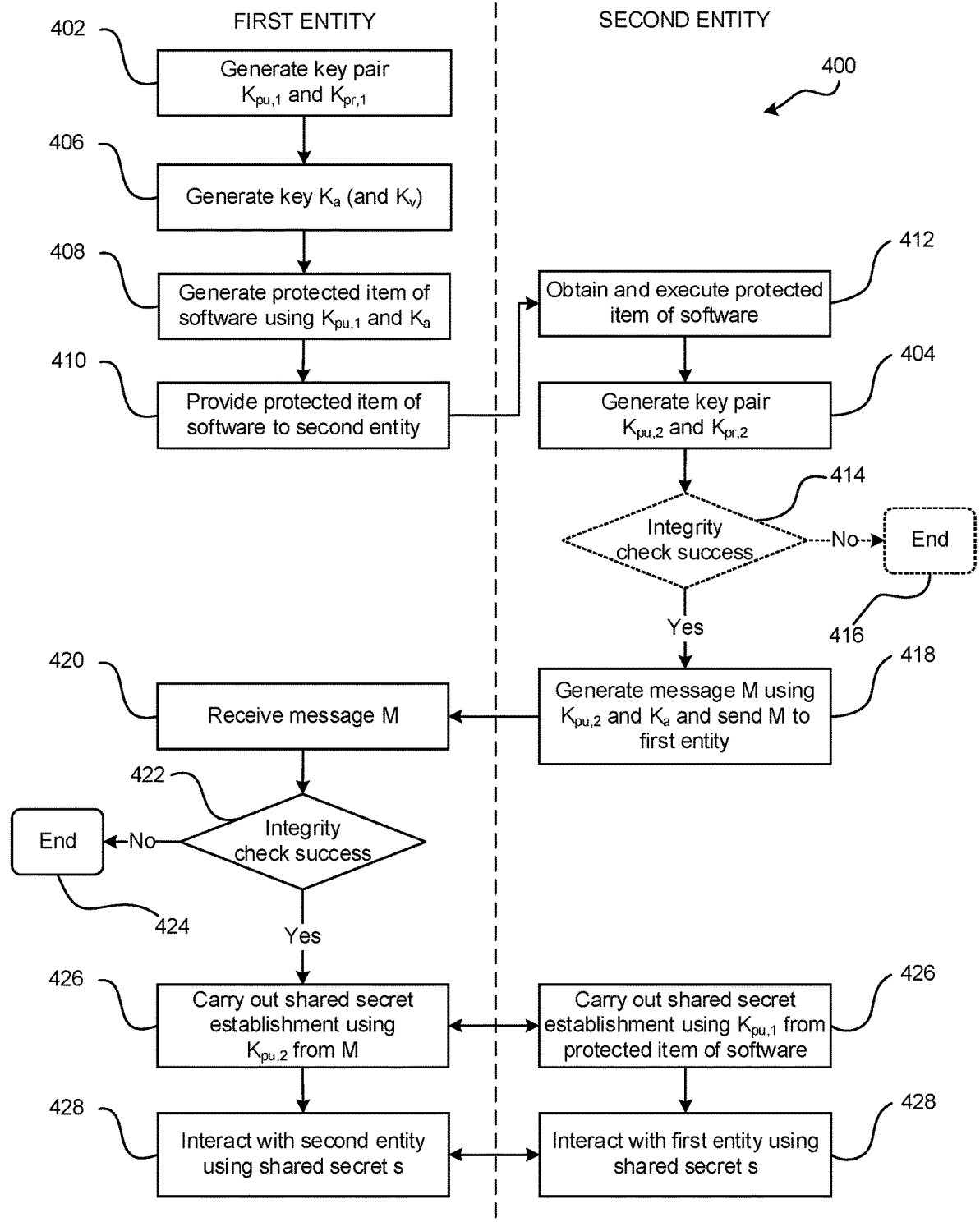

Note that the generation of the keys $K_{pu,1}$, $K_{pu,2}$, $K_{pr,1}$ and $K_{pr,2}$ may require certain parameters to have been agreed beforehand between the first entity 210 and the second entity 260. For example, with the Diffie-Hellman shared secret establishment protocol, the above-mentioned parameters p and g need to have been agreed beforehand; with the elliptic curve Diffie-Hellman shared secret establishment protocol, the above-mentioned domain parameters (p, a, b, G, n, h) or (m, f(x), a, b, G, n, h)) need to have been agreed beforehand. In some embodiments, the first entity 210 and the second entity 260 may have agreed such parameters in advance (e.g. they may be long-established parameters that both entities use). In this case, the step 404 may be carried out in advance of the second entity 260 receiving the protected item of software 240 at the step 412. In other embodiments, the parameters are provided by the first entity 210 to the second entity 260 as part of the protected item of software 240, for example as part of the data 352. In this case, the protection system 214 may be arranged to generate these parameters and store them (potentially in an obfuscated manner) as part of the data 352 at the step 408 when generating the protected item of software 240. FIG. 4b is therefore a flow chart illustrating a variation of the method 400 of FIG. 4a in which the steps 412 and 404 are reversed, so that the generation of the key pair $K_{pu,2}$ and $K_{pr,2}$ by the ephemeral key pair generation module 261 occurs after the second entity 260 receives the protected item of software 240. When using the method 400 of FIG. 4b, with the system 200 illustrated in FIG. 2a, the ephemeral key pair generation module 261 may obtain the parameters from the protected item of software 240; with the system 200 illustrated in FIG. 2b, the ephemeral key pair generation module 261 forms part of the protected item of software 240 and therefore has access to these parameters as part of that protected item of software 240—indeed, the ephemeral key pair generation module 261 may be protected by the one or more software protection techniques applied by the protection system 214 so that the parameters are hidden within the protected item of software 240.

If the protected item of software 240 comprises the verification module 360, then processing continues at an optional step 414. The verification module 360 is configured to carry out integrity verification on some or all of the protected item of software 240 received at the second entity 260. If the verification module 360 detects that a modification has been made to those parts of the protected item of software 240 that it has checked, then the method 400 may terminate at a step 416; otherwise processing continues at a step 418. If the protected item of software 240 does not comprise the verification module 360, then processing continues at the step 418.

At the step 418, as part of executing the protected item of software 240, the message generator module 356 generates the above-mentioned message M. Thus, the message generator module 356 may receive or obtain the public key $K_{pu,2}$ (as generated by the ephemeral key pair generation module 261) and generate the message M that represents that public key, with the message M comprising authentication data 504 that has been generated using, or based on, the authentication key $K_a$ so that integrity of the message M is verifiable using a verification key $K_v$ corresponding to the authentication key $K_a$. The message generator module 356 may be arranged to generate the message M with suitable addressing/identification information to enable the message M to be sent back to, and be identified by, the first entity 210—such information may, for example, form part of the data 500 of the message M.

The second entity 260 may then send the message M to the first entity 210—this may be carried out, for example, by the interface/communication module 354 of the protected item of software 240.

At a step 420, the first entity 210 receives, or obtains, the message M.

At a step 422, the first entity 210 uses its authentication module 216 to authenticate (or verify) the message M. For this the authentication module 216 uses the verification key $K_v$. As discussed above, the message M may comprise information 500 that enables the first entity 210 (or the authentication module 216) to identify which verification key $K_v$ to use (as the first entity 210 may be involved in multiple shared secret establishment procedures with multiple second entities 260). For example, the message M may comprise an index or an identifier of the second entity 260, and the first entity 210 may be arranged to store the verification key $K_v$ in association with that index or identifier when the verification key $K_v$ was initially generated, so that the verification key $K_v$ can be accessed later on upon receipt of the message M. If the authentication data 504 comprises a message authentication code, then the authentication module 216 uses the verification key $K_v$ to check that the message authentication code corresponds to the message M (or at least the part of the message M that is to be authenticated). If the authentication data 504 comprises a digital signature, then the authentication module 216 uses the verification key $K_v$ as a verification key to check that the digital signature corresponds to the message M (or at least the part of the message M that is to be authenticated).

In some embodiments, the authentication module 216 comprises a timer module 218 that is arranged to check whether or not the message M has been received at the first entity 210 sufficiently quickly. In particular, the timer module 218 may be configured to compare the time T taken from providing the protected item of software 240 to the second entity 260 at the step 410 (or from performing any one of the step 402, 406 or 408) to receipt of the message M back from the second entity 260 to a threshold period or duration of time H. If T<H (or T≤H), then the message M may be considered to have been received sufficiently quickly; otherwise, the authentication module 216 may consider the message M to be have been received too slowly (which may indicate that a third party has intercepted and may have processed or interfered with the message M or the protected item of software 240). Thus, in some embodiments, when the first entity 210 provides the protected item of software 240 to the second entity 260 at the step 410 (or when performing any one of the step 402, 406 or 408), the first entity 210 may be arranged for the timer module 218 to start a timer that measures the time until receipt of the message M from the second entity 260. Alternatively, in some embodiments, the protection system 214 may be arranged to configure the data 352 so that the data 352 stores a time value representing the time at which the first entity 210 provided the protected item of software 240 to the second entity 260 at the step 410 (or performed any one of the step 402, 406 or 408), and the message generator module 356 may be arranged to include that time value as part of the data 500 of the message M which gets returned to the first entity 210—in this way the timer module 218 is provided with the time value and can ascertain whether the message M may be considered to have been received sufficiently quickly.

Thus, the authentication module 216 may be arranged to check whether a set of one or more conditions are satisfied. One of the conditions is performance by the first entity 210 (or by the authentication module 216) of a successful check/verification of the integrity of the message M using the verification key $K_v$ as discussed above. In some embodiments, a further condition is that the message M is obtained by the first entity 210 at the step 420 within a threshold period of time H from the first entity 210 providing the protected item of software 240 to the second entity 260 at the step 410 (or from performance of any one of the steps 402, 406 or 408). It will be appreciated that other conditions may be imposed by the authentication module 216 in order for the authentication module 216 to consider validate/verify the message M.

If the authentication module 216 determines that the set of one or more conditions are not satisfied, then processing ends at a step 424.

If the authentication module 216 determines that the set of one or more conditions are satisfied, then the first entity 210 and the second entity 260 together, at a step 426, perform shared secret establishment to establish the secret. For this shared secret establishment, the first entity 210 uses its shared secret establishment module 219. The shared secret establishment module 219 may receive the public key $K_{pu,2}$ of second entity 260 (as represented in the message M) from the authentication module 216, and use this public key $K_{pu,2}$ for the shared secret establishment. The shared secret establishment module 219 may also use the private key $K_{pr,1}$ of the first entity 210 and, depending on the shared secret establishment protocol being used, may also use the public key $K_{pu,1}$ of the first entity 210. Likewise, for this shared secret establishment, the second entity 260 may use the shared secret protocol module 358 that forms part of the protected item of software 240. The shared secret protocol module 358 uses the public key $K_{pu,1}$ of first entity 210 as embedded in the protected item of software 240. The shared secret protocol module 358 may also use the private key $K_{pr,2}$ of the second entity 260 and, depending on the shared secret establishment protocol being used, may also use the public key $K_{pu,2}$ of the second entity 260.

Thus, together the shared secret establishment module 219 and the shared secret protocol module 358 carry out the shared secret establishment protocol (such as the above-described Diffie-Hellman or elliptic curve Diffie-Hellman protocols) in order to establish a shared secret s.

In some embodiments, the shared secret protocol module 358 does not form part of the protected item of software 240, but is a separate module of the second entity 260.

Finally, at a step 428, the first entity 210 and the second entity 260 interact with each other using the shared secret s. For example, the first entity 210 and the second entity 260 may use the shared secret s as a cryptographic key (or for deriving one or more cryptographic keys), which could be used, for example, for encryption/decryption and/or authentication/verification of data communicated between the first entity 210 and the second entity 260. This interaction may be carried out, at least in part, using the protected item of software 240 (i.e. some of the functionality of the protected item of software 240 is functionality that uses the shared secret s to interact with the first entity 210).

In some embodiments, the method 400 is conducted in response to one or both of the first entity 210 and the second entity 260 wishing to conduct a transaction or process with the other of the two entities.

Embodiments of the present invention find particular use in scenarios in which the use of X.509 certificates is difficult or undesirable (due to the complexity of the associated infrastructure required for X.509 certificates as well as the computational and resource overheads involved in using X.509 certificates, and in some scenarios, due to the inability of a device holding an asymmetric private key to keep the asymmetric private key confidential for a long period of time). It is often the case that a first entity may be a server-side system with substantial computational resources, but a second entity may be a much less capable device for which the processing of X.509 certificates is demanding—embodiments of the present invention find great utility in such scenarios to enable the first and second entities to establish a shared secret. For example, devices deployed in vehicles (such as cars) may have only relatively limited resources, whereas a car manufacturer may wish to establish shared secrets with those in-vehicle devices (e.g. when performing software or firmware updates or when retrieving diagnostic information)—embodiments of the present invention may assist with this, with the car manufacturer's back-end system acting as the first entity and the in-vehicle devices acting as second entities. Likewise, a bank may wish to establish shared secrets with customers' mobile devices (e.g. telephones) so that transactions can be conducted under the control of the bank and in a manner that is not computationally intensive—embodiments of the present invention may assist with this, with the bank's back-end system acting as the first entity and customer's mobile devices acting as second entities. It will be appreciated that many other deployment scenarios are possible for embodiments of the present invention.

5—Modifications

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or one or more graphical processing units (GPUs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then one or more storage media and/or one or more transmission media storing or carrying the computer program form aspects of the invention. The computer program may have one or more program instructions, or program code, which, when executed by one or more processors (or one or more computers), carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, byte code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method for a first entity and a second entity to establish a shared secret, wherein the first entity and the second entity each have a respective asymmetric key pair that comprises a public key and a corresponding private key, wherein the method comprises:
   the first entity generating a protected item of software that comprises (a) a representation of the public key of the first entity and (b) a message generator that is configured to use an authentication key;
   the first entity providing the protected item of software to the second entity;
   the second entity executing the protected item of software, said executing comprising the message generator generating a message that represents the public key of the second entity and that comprises authentication data generated using the authentication key so that integrity of the message is verifiable using a verification key corresponding to the authentication key;
   the first entity obtaining the message from the second entity;
   in response to a set of one or more conditions being satisfied, the first entity and the second entity performing shared secret establishment to establish the secret, wherein performing the shared secret establishment comprises the first entity using the public key of the second entity as represented in the message and the second entity using the public key of the first entity as represented in the protected item of software, wherein one of the conditions is performance by the first entity of a successful verification of the integrity of the message using the verification key.

2. A method for a first entity to establish a secret shared with a second entity, wherein the first entity and the second entity each have a respective asymmetric key pair that comprises a public key and a corresponding private key, wherein the method comprises the first entity:
   generating a protected item of software that comprises (a) a representation of the public key of the first entity and (b) a message generator that is configured to use an authentication key;
   providing the protected item of software to the second entity;
   obtaining from the second entity a message that represents the public key of the second entity and that comprises authentication data generated using the authentication key so that integrity of the message is verifiable using a verification key corresponding to the authentication key; and
   in response to a set of one or more conditions being satisfied, performing shared secret establishment with the second entity to establish the secret, wherein performing the shared secret establishment comprises the first entity using the public key of the second entity as represented in the message, wherein one of the conditions is performance by the first entity of a successful verification of the integrity of the message using the verification key.

3. The method of claim 1, wherein one of the conditions is that the message is obtained by the first entity within a threshold period of time from the first entity providing the protected item of software to the second entity.

4. The method of claim 1, comprising the first entity generating the asymmetric key pair of the first entity and/or the authentication key.

5. A method for a second entity to establish a secret shared with a first entity, wherein the first entity and the second entity each have a respective asymmetric key pair that comprises a public key and a corresponding private key, wherein the method comprises the second entity:
   obtaining, from the first entity, a protected item of software that comprises (a) a representation of the public key of the first entity and (b) a message generator that is configured to use an authentication key;
   executing the protected item of software, said executing comprising the message generator generating a message that represents the public key of the second entity and that comprises authentication data generated using the authentication key, wherein the authentication data is configured for verification of the integrity of the message by the first entity using a verification key corresponding to the authentication key;
   providing the message to the first entity; and performing shared secret establishment with the first entity to establish the secret, wherein performing the shared secret establishment comprises the second entity using the public key of the first entity as represented in the protected item of software.

6. The method of claim 1, comprising the second entity generating the asymmetric key pair of the second entity.

7. The method of claim 1, wherein the protected item of software is arranged so that, when executed, the protected item of software performs integrity verification on the protected item of software, and wherein the message generator only generates the message upon successful integrity verification on the protected item of software.

8. The method of claim 1, wherein either: (a) the authentication key is a symmetric key and the authentication data comprises a message authentication code; or (b) the authentication key and the verification key form an asymmetric key pair and the authentication data comprises a digital signature.

9. The method of claim 1, wherein one or more of the following apply:
(a) the public key of the first entity and the private key of the first entity are ephemeral keys;
(b) the public key of the second entity and the private key of the second entity are ephemeral keys;
(c) the authentication key and the verification key are ephemeral keys.

10. The method of claim 1, wherein performing the shared secret establishment comprises performing one of:
(a) a cryptographic key exchange protocol;
(b) a Diffie-Hellman shared secret establishment protocol;
(c) an elliptic-curve Diffie-Hellman shared secret establishment protocol.

11. The method of claim 1, wherein either (a) it is computationally infeasible for an attacker to determine the authentication key from the protected item of software or (b) it is computationally infeasible for an attacker to determine the authentication key from the protected item of software in a threshold period of time.

12. The method of claim 1, wherein the method does not make use of an X.509 certificate or a static key to establish the shared secret.

13. A system comprising a first entity computing system and a second entity computing system, wherein the first entity computing system and the second entity computing system each have a respective asymmetric key pair that comprises a public key and a corresponding private key, wherein the system is arranged for the first entity computing system and the second entity computing system to establish a shared secret by:
the first entity computing system generating a protected item of software that comprises (a) a representation of the public key of the first entity computing system and (b) a message generator that is configured to use an authentication key;
the first entity computing system providing the protected item of software to the second entity computing system;
the second entity computing system executing the protected item of software, said executing comprising the message generator generating a message that represents the public key of the second entity computing system and that comprises authentication data generated using the authentication key so that integrity of the message is verifiable using a verification key corresponding to the authentication key;
the first entity computing system obtaining the message from the second entity computing system;
in response to a set of one or more conditions being satisfied, the first entity computing system and the second entity computing system performing shared secret establishment to establish the secret, wherein performing the shared secret establishment comprises the first entity computing system using the public key of the second entity computing system as represented in the message and the second entity computing system using the public key of the first entity computing system as represented in the protected item of software, wherein one of the conditions is performance by the first entity computing system of a successful verification of the integrity of the message using the verification key.

14. A system comprising a first entity computing system, wherein the system is arranged for the first entity computing system to establish a secret shared with a second entity computing system, wherein the first entity computing system and the second entity computing system each have a respective asymmetric key pair that comprises a public key and a corresponding private key, wherein the first entity computing system is arranged to:
generate a protected item of software that comprises (a) a representation of the public key of the first entity computing system and (b) a message generator that is configured to use an authentication key;
provide the protected item of software to the second entity computing system;
obtain from the second entity computing system a message that represents the public key of the second entity computing system and that comprises authentication data generated using the authentication key so that integrity of the message is verifiable using a verification key corresponding to the authentication key; and
in response to a set of one or more conditions being satisfied, perform shared secret establishment with the second entity computing system to establish the secret, wherein performing the shared secret establishment comprises the first entity computing system using the public key of the second entity computing system as represented in the message, wherein one of the conditions is performance by the first entity computing system of a successful verification of the integrity of the message using the verification key.

15. A system comprising a second entity computing system, wherein the system is arranged for the second entity computing system to establish a secret shared with a first entity computing system, wherein the first entity computing system and the second entity computing system each have a respective asymmetric key pair that comprises a public key and a corresponding private key, wherein the second entity computing system is arranged to:
obtain, from the first entity computing system, a protected item of software that comprises (a) a representation of the public key of the first entity computing system and (b) a message generator that is configured to use an authentication key;
execute the protected item of software, said executing comprising the message generator generating a message that represents the public key of the second entity computing system and that comprises authentication data generated using the authentication key, wherein the authentication data is configured for verification of the integrity of the message by the first entity computing system using a verification key corresponding to the authentication key;

provide the message to the first entity computing system;

perform shared secret establishment with the first entity computing system to establish the secret, wherein performing the shared secret establishment comprises the second entity computing system using the public key of the first entity computing system as represented in the protected item of software.

16. The method of claim 2, wherein one of the conditions is that the message is obtained by the first entity within a threshold period of time from the first entity providing the protected item of software to the second entity.

17. The method of claim 2, comprising the first entity generating the asymmetric key pair of the first entity and/or the authentication key.

18. The method claim 2, wherein the protected item of software is arranged so that, when executed, the protected item of software performs integrity verification on the protected item of software, and wherein the message generator only generates the message upon successful integrity verification on the protected item of software.

19. The method of claim 2, wherein either: (a) the authentication key is a symmetric key and the authentication data comprises a message authentication code; or (b) the authentication key and the verification key form an asymmetric key pair and the authentication data comprises a digital signature.

20. The method of claim 2, wherein one or more of the following apply:
    (a) the public key of the first entity and the private key of the first entity are ephemeral keys;
    (b) the public key of the second entity and the private key of the second entity are ephemeral keys;
    (c) the authentication key and the verification key are ephemeral keys.

21. The method of claim 2, wherein performing the shared secret establishment comprises performing one of:
    (a) a cryptographic key exchange protocol;
    (b) a Diffie-Hellman shared secret establishment protocol;
    (c) an elliptic-curve Diffie-Hellman shared secret establishment protocol.

22. The method of claim 2, wherein either: (a) it is computationally infeasible for an attacker to determine the authentication key from the protected item of software; or (b) it is computationally infeasible for an attacker to determine the authentication key from the protected item of software in a threshold period of time.

23. The method of claim 2, wherein the method does not make use of an X.509 certificate or a static key to establish the shared secret.

24. The method of claim 5, comprising the second entity generating the asymmetric key pair of the second entity.

25. The method of claim 5, wherein the protected item of software is arranged so that, when executed, the protected item of software performs integrity verification on the protected item of software, and wherein the message generator only generates the message upon successful integrity verification on the protected item of software.

26. The method of claim 5, wherein either: (a) the authentication key is a symmetric key and the authentication data comprises a message authentication code; or (b) the authentication key and the verification key form an asymmetric key pair and the authentication data comprises a digital signature.

27. The method of claim 5, wherein one or more of the following apply:
    (a) the public key of the first entity and the private key of the first entity are ephemeral keys;
    (b) the public key of the second entity and the private key of the second entity are ephemeral keys;
    (c) the authentication key and the verification key are ephemeral keys.

28. The method of claim 5, wherein performing the shared secret establishment comprises performing one of:
    (a) a cryptographic key exchange protocol;
    (b) a Diffie-Hellman shared secret establishment protocol;
    (c) an elliptic-curve Diffie-Hellman shared secret establishment protocol.

29. The method of claim 5, wherein either: (a) it is computationally infeasible for an attacker to determine the authentication key from the protected item of software; or (b) it is computationally infeasible for an attacker to determine the authentication key from the protected item of software in a threshold period of time.

30. The method of claim 5, wherein the method does not make use of an X.509 certificate or a static key to establish the shared secret.

* * * * *